United States Patent
Vijay et al.

(10) Patent No.: US 9,967,226 B2
(45) Date of Patent: May 8, 2018

(54) PERSONALIZED DELIVERY TIME OPTIMIZATION

(71) Applicant: Microsoft Technology Licensing, LLC, Redmond, WA (US)

(72) Inventors: Ravi Kiran Holur Vijay, Mountain View, CA (US); Benjamin Arai, San Jose, CA (US); Mark Hull, San Jose, CA (US); Utku Irmak, San Francisco, CA (US); Pramod Chand Khincha, San Jose, CA (US); Samir M. Shah, San Francisco, CA (US); Ji Yan, Dublin, CA (US); Lawrence Yuan, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/289,836

(22) Filed: Oct. 10, 2016

(65) Prior Publication Data
US 2017/0026331 A1    Jan. 26, 2017

Related U.S. Application Data

(62) Division of application No. 14/320,397, filed on Jun. 30, 2014, now Pat. No. 9,473,446.

(51) Int. Cl.
*G06F 15/16*    (2006.01)
*H04L 12/58*    (2006.01)
(Continued)

(52) U.S. Cl.
CPC .......... *H04L 51/32* (2013.01); *G06Q 10/107* (2013.01); *H04L 41/147* (2013.01); *H04L 43/08* (2013.01);
(Continued)

(58) Field of Classification Search
CPC ..... H04L 41/147; H04L 43/08; H04L 51/108; H04L 51/26; H04L 51/32; H04L 51/24;
(Continued)

(56) References Cited

U.S. PATENT DOCUMENTS 7,783,776 B2    8/2010  Nimour
7,921,174 B1 *  4/2011  Denise ................. G06Q 10/107
                                                      709/206

(Continued)

OTHER PUBLICATIONS

"U.S. Appl. No. 14/320,397, Examiner Interview Summary dated May 20, 2016", 3 pgs.

(Continued)

*Primary Examiner* — Jungwon Chang
(74) *Attorney, Agent, or Firm* — Schwegman Lundberg & Woessner, P.A.

(57) ABSTRACT

Techniques for optimizing a delivery time for the delivery of messages are described. According to various embodiments, a system determines, for each of a plurality of time intervals, a likelihood of a particular member of an online social network service performing a particular member user action on a particular message content item during the corresponding time interval. The plurality of time intervals are then ranked, based on the determined likelihoods corresponding to the plurality of time intervals. Thereafter, a particular time interval is identified from among the plurality of time intervals that is associated with a highest ranking. The particular time interval is then classified as an optimum personalized message delivery time for the particular member.

20 Claims, 21 Drawing Sheets

(51) Int. Cl.
| | |
|---|---|
| *H04L 29/08* | (2006.01) |
| *H04L 29/06* | (2006.01) |
| *H04L 12/26* | (2006.01) |
| *G06Q 10/10* | (2012.01) |
| *H04L 12/24* | (2006.01) |
| *G06F 17/30* | (2006.01) |
| *G06Q 50/00* | (2012.01) |

(52) U.S. Cl.
CPC .............. *H04L 51/14* (2013.01); *H04L 51/20* (2013.01); *H04L 51/26* (2013.01); *H04L 63/102* (2013.01); *H04L 67/306* (2013.01); *G06F 17/30041* (2013.01); *G06F 17/3053* (2013.01); *G06F 17/30699* (2013.01); *G06F 17/30828* (2013.01); *G06Q 50/01* (2013.01)

(58) Field of Classification Search
CPC ..... H04L 67/306; H04L 67/22; H04L 51/043; H04L 51/20; H04L 51/14; H04L 63/102; G06F 17/3053; G06F 17/30699; G06F 17/30828; G06F 17/30041; G06F 15/16; G06Q 10/107; G06Q 50/01
USPC ..... 709/238, 204, 206, 207, 224; 705/14.53; 706/12; 715/736, 738, 747
See application file for complete search history.

(56) References Cited

U.S. PATENT DOCUMENTS

| | | | |
|---|---|---|---|
| 8,924,326 | B2 | 12/2014 | Arquette et al. |
| 9,473,446 | B2 | 10/2016 | Vijay et al. |
| 2002/0087649 | A1* | 7/2002 | Horvitz ................ G06Q 10/107 709/207 |
| 2003/0046421 | A1* | 3/2003 | Horvitz ................ G06Q 10/107 709/238 |
| 2003/0187868 | A1 | 10/2003 | Igarashi |
| 2005/0010679 | A1 | 1/2005 | Yamaga et al. |
| 2005/0240655 | A1* | 10/2005 | Lipton ................... H04L 51/24 709/207 |
| 2007/0130323 | A1 | 6/2007 | Landsman et al. |
| 2010/0082751 | A1* | 4/2010 | Meijer .................... G06F 15/16 709/206 |
| 2011/0252107 | A1* | 10/2011 | Chestnut ................ G06Q 10/00 709/206 |
| 2013/0086179 | A1 | 4/2013 | Coleman et al. |
| 2013/0166653 | A1 | 6/2013 | Sherrets et al. |
| 2013/0267253 | A1 | 10/2013 | Case et al. |
| 2013/0325755 | A1* | 12/2013 | Arquette ................. H04L 51/32 706/12 |
| 2014/0100952 | A1* | 4/2014 | Bart .................... G06Q 30/0264 705/14.53 |
| 2015/0341290 | A1* | 11/2015 | Cherifi .................. H04L 51/043 709/206 |
| 2015/0350376 | A1* | 12/2015 | Vijay .................... H04L 67/325 709/204 |
| 2015/0381552 | A1 | 12/2015 | Vijay |

OTHER PUBLICATIONS

"U.S. Appl. No. 14/320,397, Final Office Action dated Feb. 20, 2015", 10 pgs.
"U.S. Appl. No. 14/320,397, Final Office Action dated Mar. 25, 2016", 9 pgs.
"U.S. Appl. No. 14/320,397, Non Final Office Action dated Aug. 7, 2015", 10 pgs.
"U.S. Appl. No. 14/320,397, Non Final Office Action dated Oct. 23, 2014", 8 pgs.
"U.S. Appl. No. 14/320,397, Notice of Allowance dated Jun 17, 2016", 5 pgs.
"U.S. Appl. No. 14/320,397, Response filed Jan. 23, 2015 to Non Final Office Action dated Oct. 23, 2014", 9 pgs.
"U.S. Appl. No. 14/320,397, Response filed Feb. 5, 2016 to Non Final Office Action dated Aug. 7, 2015", 10 pgs.
"U.S. Appl. No. 14/320,397, Response filed May 25, 2016 to Final Office Action dated Mar. 25, 2016", 12 pgs.
"U.S. Appl. No. 14/320,397, Response filed Jun. 22, 2015 to Final Office Action dated Feb. 20, 2015", 12 pgs.
"U.S. Appl. No. 14/320,397, Response filed Oct. 6, 2014 to Restriction Requirement dated Sep. 4, 2014", 6 pgs.
"U.S. Appl. No. 14/320,397, Restriction Requirement dated Sep. 4, 2014", 6 pgs.

* cited by examiner

SET EMAIL PREFERENCES

We have automatically adjusted your preferences, based on our predictions of what is most interesting and relevant to you!

News Updates Email — Never / Daily / Weekly / Monthly (Daily)

Network Updates Email — Never / Daily / Weekly / Monthly (Daily)

Jobs Updates Email — Never / Daily / Weekly / Monthly (Weekly)

Influencer Updates Email — Never / Daily / Weekly / Monthly (Never)

Companies Updates Email — Never / Daily / Weekly / Monthly (Never)

Groups Updates Email — Never / Daily / Weekly / Monthly (Never)

Universities Updates Email — Never / Daily / Weekly / Monthly (Never)

Digest Email — Never / Daily / Weekly / Monthly (Monthly)

Includes:
- ○ News Updates
- ○ Network Updates
- ○ Jobs Updates
- ● Influencers Updates
- ● Companies Updates
- ● Groups Updates
- ● Universities Updates

[SUBMIT]  [CANCEL]

*Fig. 12*

PERSONALIZED DELIVERY TIME OPTIMIZATION

CROSS-REFERENCE TO RELATED APPLICATIONS

This application is a divisional of prior application Ser. No. 14/320,397, filed on Jun. 20, 2014, which is incorporated by reference herein in its entirety.

TECHNICAL FIELD

The present application relates generally to data processing systems and, in one specific example, to techniques for optimizing a delivery time for the delivery of messages.

BACKGROUND

Social network services such as LinkedIn® reach out to many members via email. These emails may contain information about news articles, influencer posts, connection updates, group discussions, marketing content, etc.

BRIEF DESCRIPTION OF THE DRAWINGS

Some embodiments are illustrated by way of example and not limitation in the figures of the accompanying drawings in which:

FIG. 12 illustrates an exemplary user interface for adjusting email preferences, according to various embodiments;

DETAILED DESCRIPTION

Figure 1:
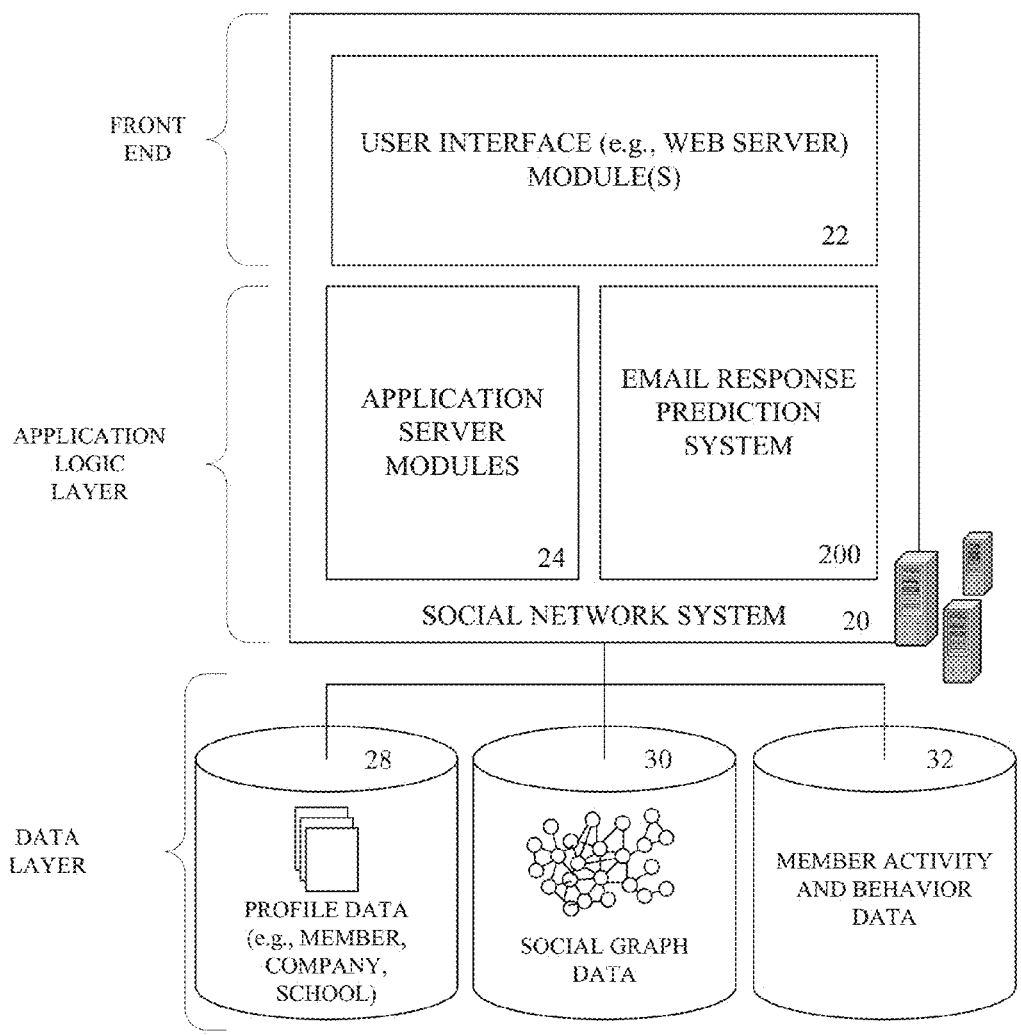
FIG. 1 is a block diagram showing the functional components of a social networking service, consistent with some embodiments of the invention.

Example methods and systems for optimizing a delivery time for the delivery of messages are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments described herein, an email response prediction system is configured to predict the likelihood of a user performing a user action on a particular email content item. For example, the email response prediction system may predict the likelihood that a particular member of an online social network service (e.g., LinkedIn®) will click on a particular item in a digest email. As another example, the e-mail response prediction system may predict the likelihood that a particular member of the online social network service will access, open, or view any mail. Accordingly, the email response prediction system described herein is configured to determine or predict what emails (or what content within email s) a member of an online social network service is likely to interact with. This information may be used by the email response prediction system to, for example, downshift/filter out certain email's to members if the email response prediction system determines that there's a low likelihood of a click on that email, which may reduce costs and member annoyance, while dramatically improving click through rate (CTR).

The email response prediction system may include various types of component modules including a source module that encodes raw data from external data sources into feature vectors, and assembles the feature vectors to generate an assembled feature vector. In some embodiments, the assembled feature vector output by the source module may include various features describing a member of a social networking website, a particular email content item, a member's email activities, a member's other activities on the social networking website, activities of similar members, activities of a member's connections, and so on. The assembled feature vector may then be passed to a prediction module for predicting whether the particular member will click on the particular email content item.

The prediction module may use any one of various known prediction modeling techniques to perform the prediction modeling. For example, the prediction module may apply a statistics-based machine learning model such as a logistic regression model to the features in the assembled feature vector. For example, the email response prediction system 200 may use an L2-regularized logistic regression, i.e., $$\frac{1}{2}\omega^T \cdot \omega + C \cdot \sum_{i=1}^{l} \log(1 + e^{-y_i \omega^T \cdot x_i}),$$

in which the function is minimized as a function of ω.

Thus, to improve the user experience, for a given member and email type or content, an email response prediction system predicts the response probability (where the response can be a click, registration or any other activity). With such a probability, a number of actions can be taken, including deciding not to send the email, recommending an unsubscription, personalizing the email by re-ordering the contents, portfolio optimization processes (where the e-mail response prediction system adjusts various aspects of e-mail distribution to conform to members interests holistically), and so on.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generate various user interfaces e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social network service. A "connection" may require a bilateral agreement by the members, such that both members acknowledge the establishment of the connection. Similarly, with some embodiments, a member may elect to "follow" another member. In contrast to establishing a connection, the concept of "following" another member typically is a unilateral operation and, at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behaviour (e.g., content viewed, links or member-interest buttons selected, etc.) may be monitored and information concerning the member's activities and behaviour may be stored, for example, as indicated in FIG. 1 by the database with reference number 32. This information may be used to classify the member as being in various categories. For example, if the member performs frequent searches of job listings, thereby exhibiting behaviour indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts. With some embodiments, the social network system 20 includes what is generally referred to herein an email response prediction system 200. The email response prediction system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices e.g., phone, or tablet computing devices) having a mobile operating system.

Figure 2:
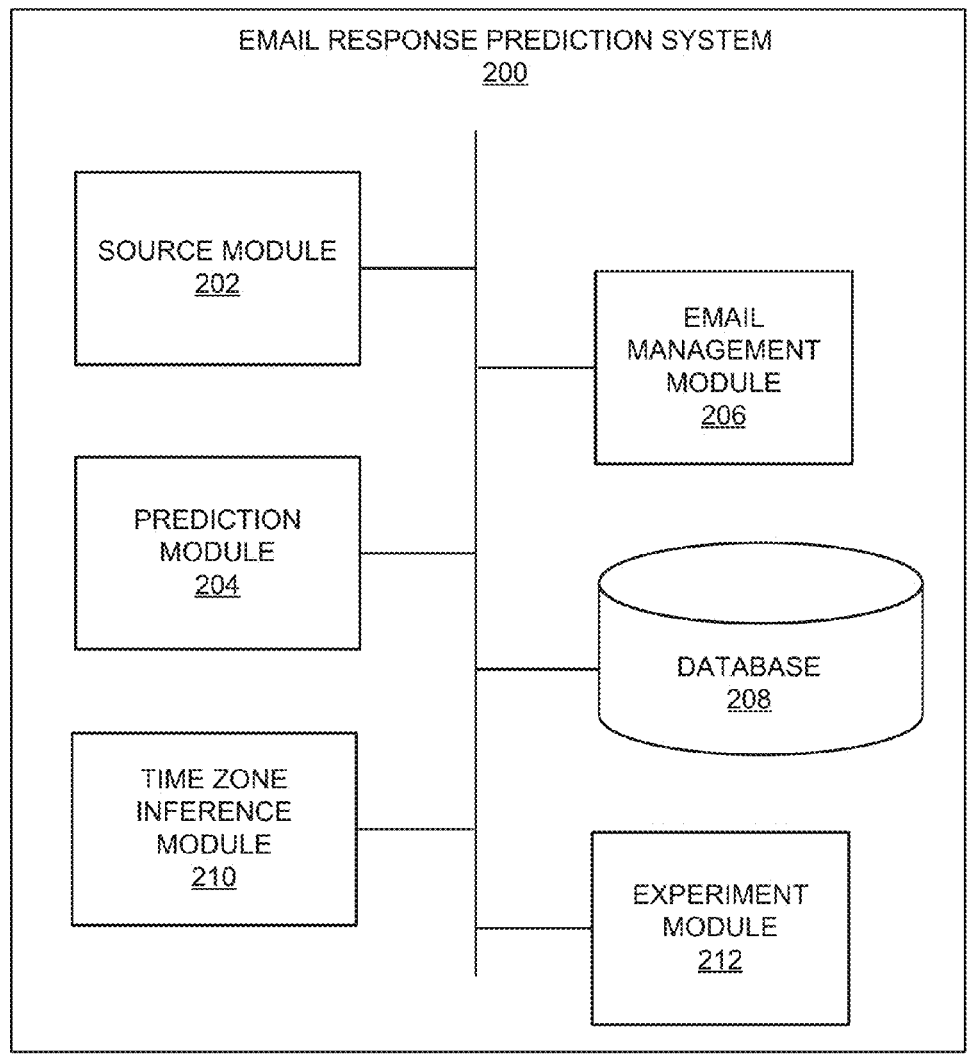
FIG. 2 is a block diagram of an example system, according to various embodiments.

Turning now to FIG. 2, an email response prediction system 200 includes a source module 202, a prediction module 204, an email management module 206, and a database 208. The modules of the email response prediction system 200 may be implemented on or executed by a single device such as a response prediction device, or on separate devices interconnected via a network. The aforementioned response prediction device may be, for example, a client machine or application server.

Briefly, the source module 202 is configured to access various data, including email content data describing a particular email content item and member email interaction data describing a particular member's interactions with various email content. The source module 202 also encodes the data accessed from the external data sources into one or more feature vectors, and assembles the one or more feature vectors to thereby generate an assembled feature vector (see FIG. 5). Thereafter, the prediction module 204 performs a prediction modeling process based on the assembled feature vector and a prediction model to predict a likelihood of a particular member performing a particular user action on a particular email content item (e.g., the email content item described by the raw email content data). The prediction module 204 may use any one of various known prediction modeling techniques to perform the prediction modeling. For example, the prediction module 204 may apply a statistics-based machine learning model such as a logistic regression model to the assembled feature vector.

Figure 5:
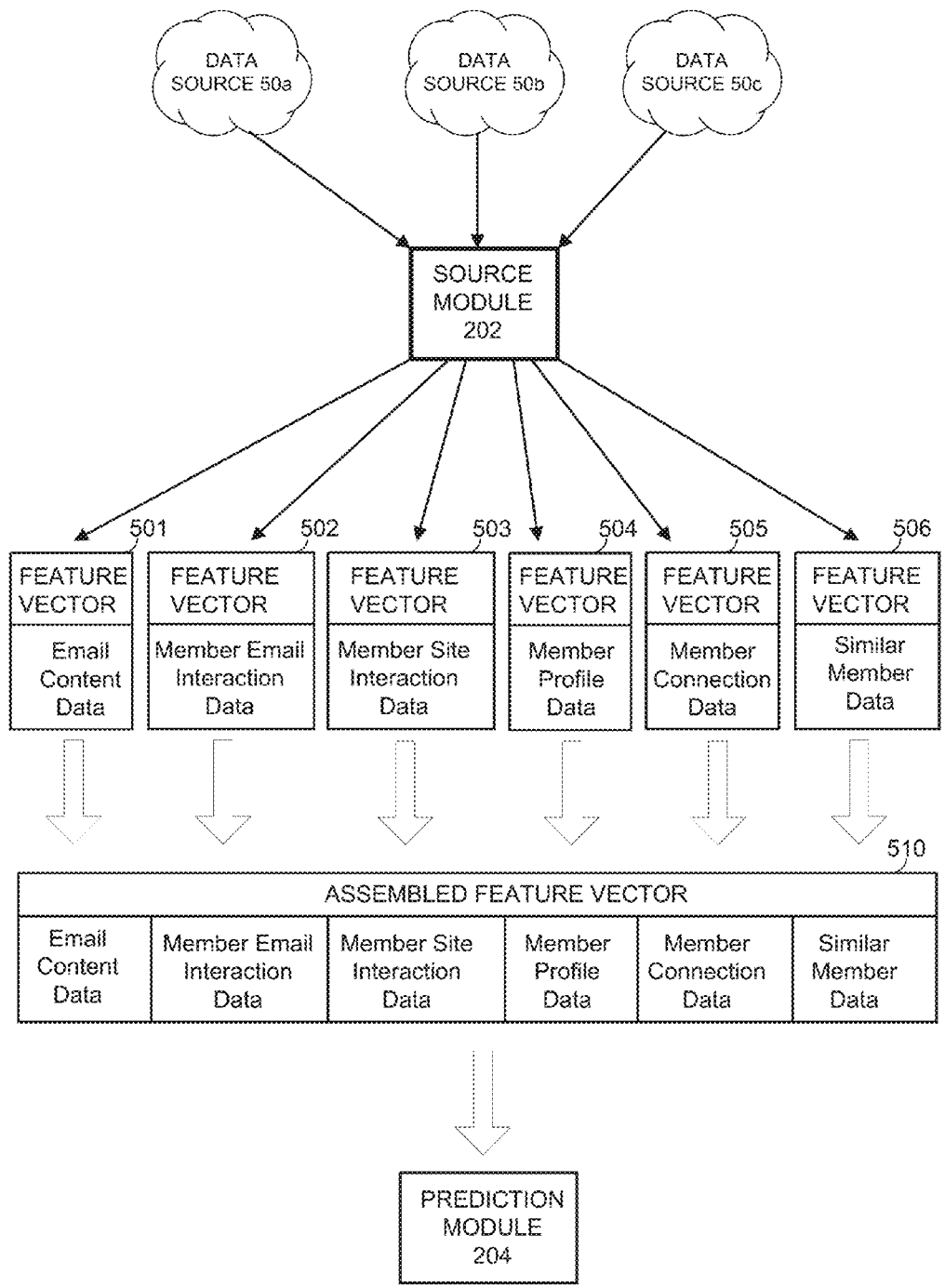
FIG. 5 illustrates an exemplary data flow, according to various embodiments.

FIG. 5 illustrates a schematic view of a data flow with regards to portions of the email response prediction system 200. As illustrated in FIG. 5, the source module 202 may extract or fetch more features or raw data located at external data source(s) 50a-50c. In some embodiments, the external data sources 50a-50c may correspond to remote data storage facilities, data repositories, Web servers, etc., that are accessible by the source modules 202 via a network (e.g., the Internet). According to various embodiments, the raw features may be any type of information that may be used to predict the likelihood that a particular member will perform a particular user action on a particular email content item. For example, the source modules 202 may access email content data describing a particular email content item and member email interaction data describing a particular member's interactions with various email content, as described in more detail below.

Figure 3:
FIG. 3 illustrates an exemplary digest email, according to various embodiments.

In some embodiments, the term "email content item" refers to an email of a particular type, such as a network connection update e-mail, a news update e-mail, a jobs update e-mail, an influencer post update e-mail, a company update e-mail, a group update e-mail, and a university update e-mail. In some embodiments, the email type is a digest e-mail associated with an online social network service (see FIG. 3), the digest e-mail including at least one of network connection update information, news update information, jobs update information, influencer post update information, company update information, group update information, university update information. In some embodiments, the term "email content item" refers to content included within an email (e.g., a digest email), such as network update information, Influencer update information, jobs update information, groups update information, universities update information, companies update information, etc. In some embodiments, the email content item may be an advertisement, offer, promotion, coupon, special, deal, an article, a news item, a blog post, and so on, included in an email or another notification (e.g., text message, instant message, chat message, etc).

In some embodiments, the user action may be a click response, a non-click response, a hover response (e.g., the user causes a mouse cursor to hover over the email content item for a predetermined period of time), an unsubscribe response, a conversion response (e.g., the user selects an advertisement or offer in the email and completes a transaction based on the advertisement), a like response (e.g., the member likes the item), a comment response (e.g., the member comments on the item), a share response e.g., the member shares the item), a follow response (e.g., the member follows the items), a rating response (e.g., the member rates the email content item, based on a range of rating options displayed in conjunction with the email content item), and so on.

Figure 6:
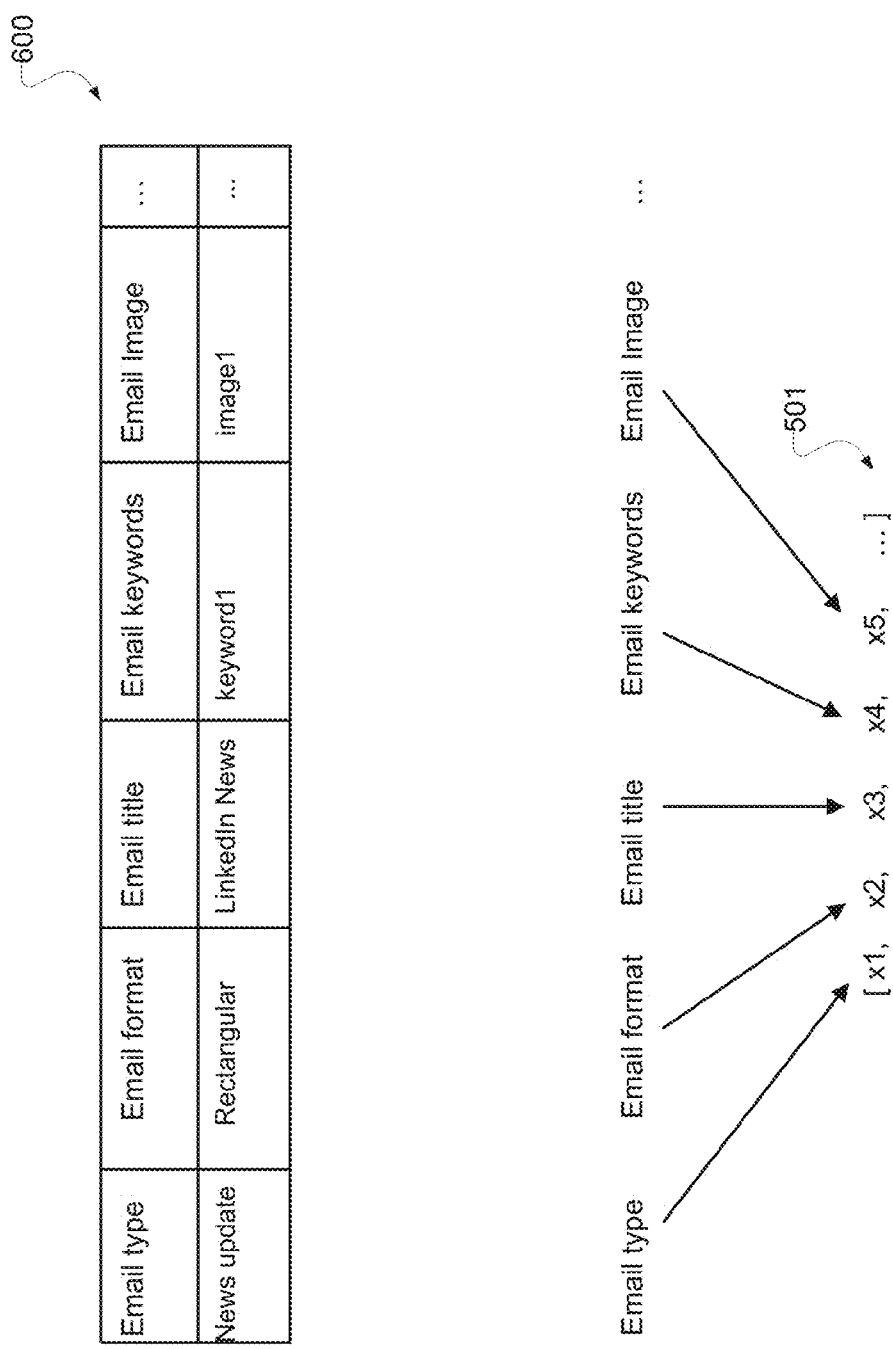
FIG. 6 illustrates an example of email content data and a feature vector containing email content data, according to various embodiments.

In some embodiments, the email content data accessed by the source module 202 specifies an email type, email format, email title, email keywords, and email image, email content item rendering information (e.g., various rendering characteristics of an email content item with respect to the appearance of the email content item, such as email format, email size/shape, email image characteristics, email color characteristics, email border/frame characteristics, email title font size, email title font type, email keyword font size, email keyword font type, etc.), and so on. The external data source from which such raw email content data may be accessed may be a database, data repository, storage facility, Web server, etc., associated with the social network service such as LinkedIn® or Facebook®. For example, FIG. 6 illustrates an example of e-mail content data 600 that may be accessed by the source module 202 and encoded into a feature vector. In particular, the email content data 600 identifies email type, email format, email title, email keywords, and email image, etc., for a given email. Thus, the source module 202 may encode the aforementioned email content data 600 into one or more feature vectors 501, which may be then be included in the final assembled feature vector 510 that is passed to the prediction module 204 (e.g., see FIG. 5).

Figure 7:
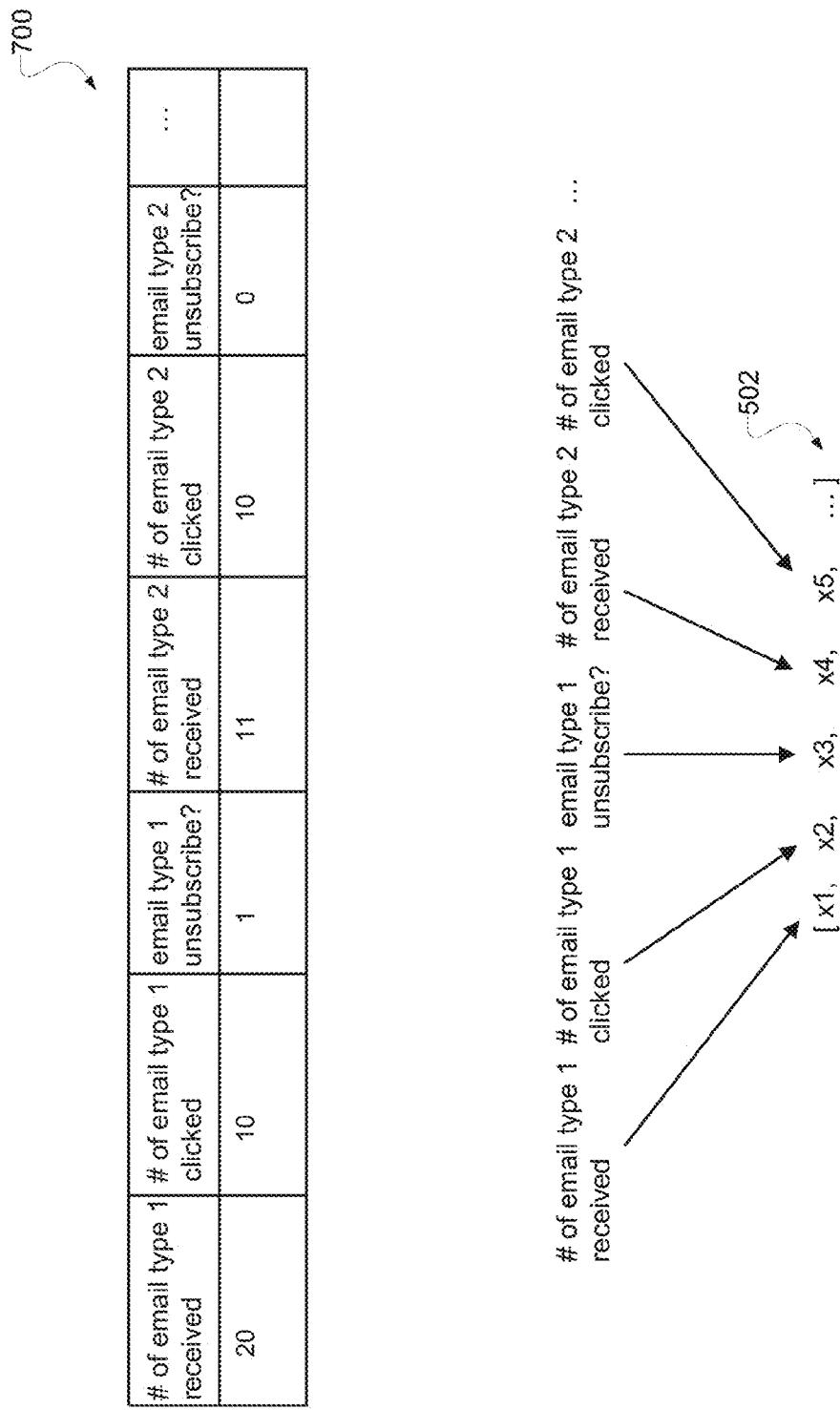
FIG. 7 illustrates an example of member email interaction data and a feature vector containing member email interaction data, according to various embodiments.

According to various exemplary embodiment, the supervised-learning model performed by the prediction module 204 may take into account features related to the member's email activities (how many emails were sent out for each type and how many clicks were received, or if the member has unsubscribed from any types of emails, etc.). For example, the source module 202 may access, from a data source (e.g., data sources 50a-50c in FIG. 5), member e-mail interaction data describing a history of the member's interaction with various e-mail content items for various types of emails (network connection update e-mail, a news update e-mail, etc.). In some embodiments, the member email interaction data may indicate a quantity of various email types transmitted to the particular member (e.g., over a given time interval), a quantity of clicks submitted by the particular member in conjunction with the various email types (e.g., over a given time interval), a quantity of email unsubscribe requests submitted by the particular member in conjunction with the various email types (e.g., over a given time interval). For example, FIG. 7 illustrates an example of member e-mail interaction data 700 that may be accessed by the source module 202 and encoded into a feature vector 502. In particular, the member e-mail interaction data 700 identifies how many of a first type of e-mail and the user has received (e.g., over a given time period), how many of the first type of e-mail to the user has clicked on (e.g., over a given time interval), whether or not the user has unsubscribed from the first type of e-mail (e.g., during a given time interval), and so on for other types of e-mails. Thus, the source module 202 may encode the aforementioned member e-mail interaction data 700 into one or more feature vectors 502, which may be then included in the final assembled feature vector 510 that is passed to the prediction module 204 (e.g., see FIG. 5).

Figure 8:
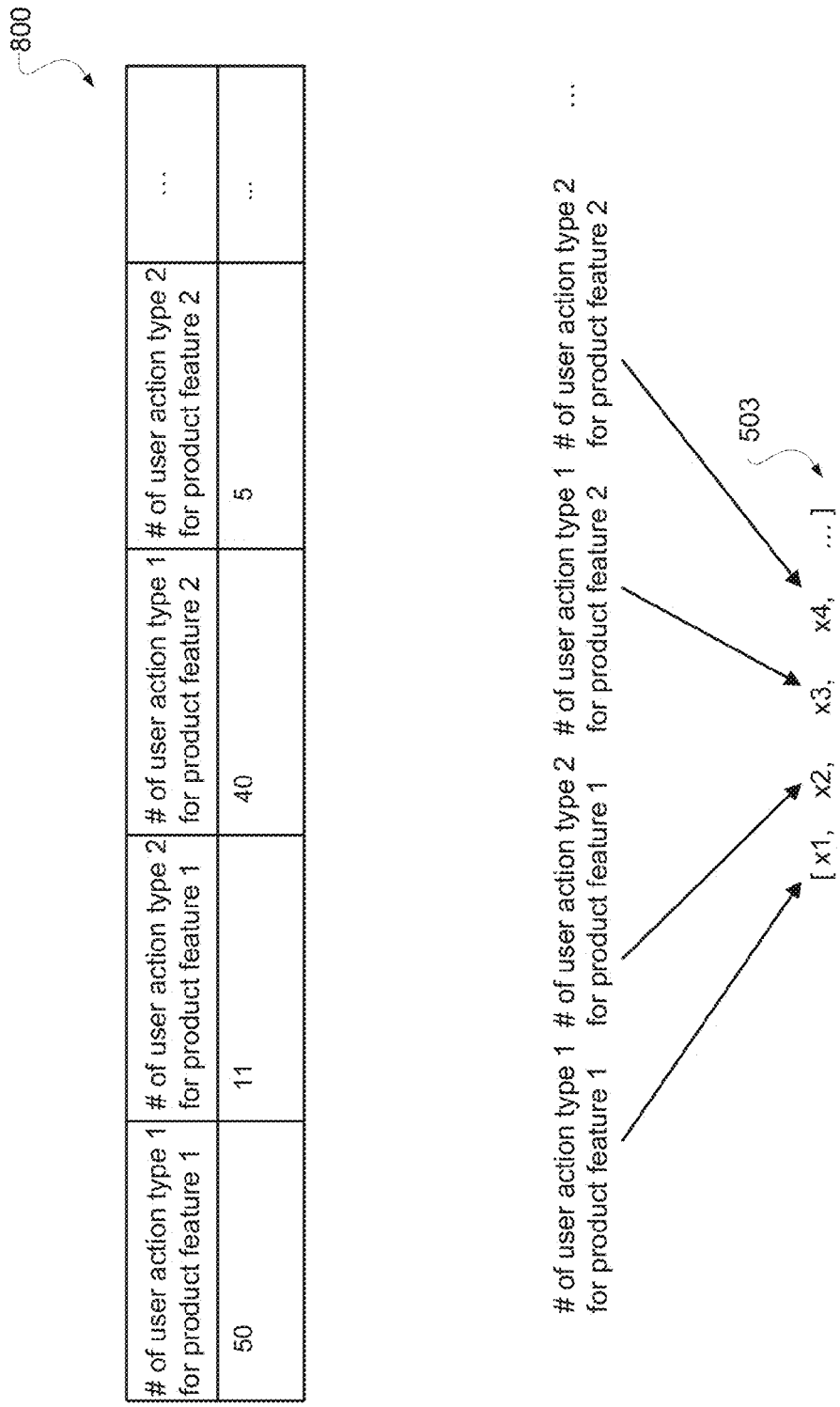
FIG. 8 illustrates an example of member site interaction data and a feature vector containing member site interaction data, according to various embodiments.

According to various exemplary embodiments, the supervised learning model performed by the prediction module 204 may take into account features related to the member's other activities on the site (page views, likes, the volume and type of the content consumed, the searches conducted on the site, etc.). For example, the source module 202 may access, from a data source (e.g., data sources 50a-50c in FIG. 5), member site interaction data describing the particular member's interaction with various features or content of an online social network service. In some embodiments, the member site interaction data may indicate a quantity of various user actions (e.g., views, impressions, likes, comments, shares, follows, posts, etc.) performed by the particular member in association with the various features, products, or content, associated with an online social network service (e.g., a content feed, a people you may know user interface, a search user interface, a jobs page, a member profile page, a company's page, a groups page, an Influencers page, a university page, etc., on LinkedIn). For example, FIG. 8 illustrates an example of member site interaction data 800 that may be accessed by the source module 202 and encoded into a feature vector 503. In particular, the member e-mail interaction data 800 identifies how many times the user has performed a particular user action (e.g., views, impressions, likes, comments, shares, follows, posts, etc.) in conjunction with the particular product feature (e.g., during a given time interval). Thus, the source module 202 may encode the aforementioned member site interaction data 800 into one or more feature vectors 503, which may be then included in the final assembled feature vector 510 that is passed to the prediction module 204 (e.g., see FIG. 5).

The member email interaction data and member site interaction data may be stored in a server or similar storage facility (e.g., database, data repository, etc.), and may correspond to member interaction history or behaviour history associated with an account of the member on a social network service such as LinkedIn® or Facebook®. For example, the member email interaction data and member site interaction data may correspond to the profile data, social graph data, and/or member activity and behaviour data stored in the databases 28, 30 and 32 of social network system 20 illustrated in FIG. 1. Accordingly, the external data source from which such raw member data may be accessed may be a database, data repository, storage facility, Web server, etc., associated with a social network service such as LinkedIn® or Facebook®.

According to various exemplary embodiments, the member email interaction data and/or member site interaction data may include context data or context features describing a potential or actual context in which a particular member may interact with a particular email content item or site product. Examples of raw context data include time, date, hour of day, day of week, hour of week, Internet Protocol (IP) address, current user geo-location information, whether the email is accessed via a mobile device (e.g., smartphone or tablet) or a non-mobile device (e.g., desktop), the channel through which the email content item is displayed (e.g., email application, web-accessible email, SMS or MMS text message, instant chat message, In-mail service on LinkedIn®, Messenger service on Facebook®, etc.), browser data describing a browser utilized to render email content (e.g., browser model, browser brand, browser capabilities, browser version, etc.), and so on.

Figure 9:
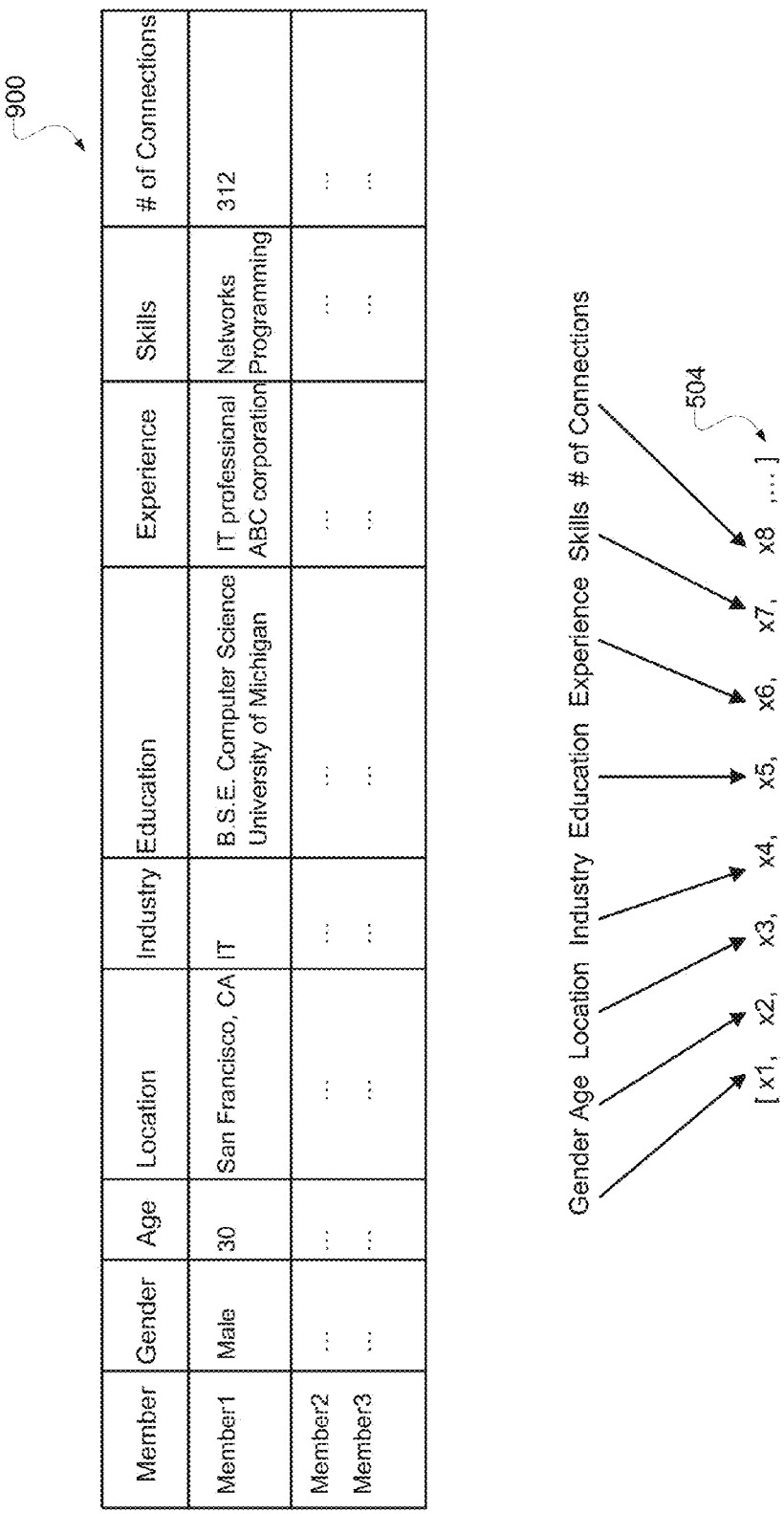
FIG. 9 illustrates an example of member profile data and a feature vector containing member profile data, according to various embodiments.

According to various exemplary embodiments, the supervised learning model performed by the prediction module 204 may take into account member profile data related to the member (e.g., member profile attributes). For example, the source module 202 may access, from a data source (e.g., data sources 50a-50c in FIG. 5), member profile data describing a particular member, including gender, age, current location, previous locations, industry, education, alma mater, current job, current employer, previous jobs, previous employers, experience, skills, number of connections, endorsements, seniority level, company size, identity of connections, networks, groups, interests, preferences, hobbies, purchase history, browsing history, ethnicity, sexual orientation, and so on. For example, FIG. 9 illustrates an example of member profile data 900 that may be accessed by the source module 202 and encoded into a feature vector 504, which may be then included in the final assembled feature vector 510 that is passed to the prediction module 204 (e.g., see FIG. 5). The raw member profile data may be stored in a server or similar storage facility e.g., database, data repository, etc.), and may correspond to member profile data or member attributes associated with an account of the member on a social network service such as LinkedIn® or Facebook®. For example, the raw member profile data may correspond to the profile data, social graph data, and/or member activity and behaviour data stored in the databases 28, 30 and 32 of social network system 20 illustrated in FIG. 1. Accordingly, the external data source from which such raw member data may be accessed may be a database, data repository, storage facility, Web server, etc., associated with a social network service such as LinkedIn® or Facebook®.

According to various exemplary embodiments, the supervised learning model performed by the prediction module 204 may take into account various features related to the member connections of the particular member on the online social network service. For example, the source module 202 may extract various types of data described above (e.g., member profile data, member e-mail interaction data, member site interaction data, etc.) that are associated with the member's connections. In some embodiments, the source module 202 may access such information associated with one or more member connections having a certain degree of connectedness with the particular member (e.g., first-degree only, or first and second degree connections only, etc.). In some embodiments, the source module 202 may access information associated with one or more member connections that have interacted with the particular member to a certain extent degree (e.g., exchanged a threshold number of messages, posts, recommendations, endorsements, etc., with the particular member), and so on. Thus, the source module 202 may encode the aforementioned data into one or more feature vectors 505, which may be then included in the final assembled feature vector 510 that is passed to the prediction module 204 (e.g., see FIG. 5). In a case where features for a single member connection are utilized, the source module 202 may generate a feature vector for the data (e.g., the member site interaction data) for a single member connection for insertion into the assembled feature vector. In a case where features from multiple member connections are utilized, the source module 202 may generate a separate feature vector for the data (e.g., the member site interaction data) of each member connection for insertion into the assembled feature vector, or the source module 202 may generate a single feature vector for the data (e.g., the member site interaction data) of all the member connections (e.g., based on average, median, mean, etc., values) for insertion into the assembled feature vector. In some embodiments, the activity of the member connections may be weighted by the strength of the connection. For example, if the source module 202 determines that a given member connected to the particular member has a strong relationship with the particular member (e.g., based on the exchange of a threshold number of messages, posts, recommendations, endorsements, etc., with the particular member), then the source module 202 may weigh the data associated with this member connection more than the data associated with another member connection.

According to various exemplary embodiments, the supervised learning model performed by the prediction module 204 may take into account various features related to members of the online social network service that are similar to the particular member. For example, the source module 202 may extract various types of data described above (e.g., member profile data, member e-mail interaction data, member site interaction data, etc.) that are associated with similar members. The source module 202 may determine similar members based on similarities in the member profile data of various members e.g. members that have the same/similar titles, seniority levels, etc., or work in the same industry, function area, etc.), as well as similarities based on other member activities (e.g., member site interaction data, member e-mail interaction data, etc.), or based on similarities in the connections of the members, and so on. Thus, the source module 202 may encode the features of similar members into one or more feature vectors 506, which may be then included in the final assembled feature vector 510 that is passed to the prediction module 204 (e.g., see FIG. 5). In a case where features for a single similar member are utilized, the source module 202 may generate a feature vector for the data (e.g., the member site interaction data) for a single similar member for insertion into the assembled feature vector. In a case where features from multiple similar members are utilized, the source module 202 may generate a separate feature vector for the data (e.g., the member site interaction data) of each similar member for insertion into the assembled feature vector, or the source module 202 may generate a single feature vector for the data (e.g., the member site interaction data) of all the similar members (e.g., based on average, median, mean, etc., values) for insertion into the assembled feature vector. In some embodiments, the activity of the member connections may be weighted by how similar the member is to the particular member. For example, if the source module 202 determines that a similar member is very similar to a particular member (e.g., based on a close match between the member profile attributes of the similar member and the particular member), then the source module 202 may weight the data associated with this similar member more than the data associated with another member that is not as similar to the particular member.

In some embodiments, the features associated with one or more similar members or member connections of the particular member (consistent with various embodiments described above) may replace the features associated with the particular member of themselves. For example, the features associated with similar members or member connections may be inserted into the feature vectors 502-504.

As described above, the source module 202 encodes the data accessed from the external data sources into one or more feature vectors 501-506, and assembles the one or more feature vectors to thereby generate an assembled feature vector 510 (see FIG. 5). As understood by those skilled in pattern recognition and machine learning, a feature vector is an n-dimensional vector of numerical features that represent some object. According to various exemplary embodiments, the source module 202 may access a configuration file (e.g., in database 208) specifying raw data encoding rules that describe how the rotator is to be encoded into the feature vectors. An example of a raw data encoding rule is: a particular member feature F located at storage location L of the external data source S is to be inserted into position X of a member feature vector M. Accordingly, with reference to FIGS. 5-9, the configuration file may specify how the source module 202 is to encode member e-mail interaction features into a member e-mail interaction feature vector 502, member site interaction features into a member site interaction feature vector 503, member profile features into a member profile feature vector 504, and so on.

As described above, the prediction module 204 performs a prediction modeling process based on the assembled feature vector 510 and a prediction model to predict a likelihood (e.g., the probability) of the particular member performing a particular user action (e.g., click) on the particular email content item (e.g., a particular type of e-mail).

The prediction module may use any one of various known prediction modeling techniques to perform the prediction modelling process. For example, according to various exemplary embodiments, the prediction module may perform the prediction modeling process based on a statistics-based machine learning model such as a logistic regression model.

As understood by those skilled in the art, logistic regression is an example of a statistics-based machine learning technique that uses a logistic function. The logistic function is based on a variable, referred to as a logit. The logit is defined in terms of a set of regression coefficients of corresponding independent predictor variables. Logistic regression can be used to predict the probability of occurrence of an event given a set of independent/predictor variables. A highly simplified example machine learning model using logistic regression may be $\ln[p/(1-p)]=a+BX+e$, or $[p/(1-p)]=\exp(a+BX+e)$, where ln is the natural logarithm, $\log_{exp}$, where $\exp=2.71828\ldots$, p is the probability that the event Y occurs, $p(Y=1)$, $p/(1-p)$ is the "odds ratio", $\ln[p/(1-p)]$ is the log odds ratio, or "logit", a is the coefficient on the constant term, B is the regression coefficient(s) on the independent/predictor variable(s), X is the independent/predictor variable(s), and e is the error term.

The independent/predictor variables of the logistic regression model are the attributes represented by the assembled feature vectors described throughout. The regression coefficients may be estimated using maximum likelihood or learned through a supervised learning technique from data collected in logs or calculated from log data, as described in more detail below. Accordingly, once the appropriate regression coefficients (e.g., B) are determined, the features included in the assembled feature vector may be plugged in to the logistic regression model in order to predict the probability that the event Y occurs (where the event Y may be, for example, whether the particular member clicks on the particular email content item in the particular context). In other words, provided an assembled feature vector including various features associated with a particular member, a particular email content item, a member's email activities, a member's other activities on an online social network service website, and so on, the assembled feature vector may be applied to a logistic regression model to determine the probability that the particular member will respond to the particular email content item in a particular way (e.g., click). Logistic regression is well understood by those skilled in the art, and will not be described in further detail herein, in order to avoid occluding various aspects of this disclosure.

The prediction module may use various other prediction modeling techniques understood by those skilled in the art to predict whether a particular member will click on a particular email content item. For example, other prediction modeling techniques may include other machine learning models such as a Naïve Bayes model, a support vector machines (SVM) model, a decision trees model, and a neural network model, all of which are understood by those skilled in the art.

According to various exemplary embodiments, the email response prediction system may be used for the purposes of both off-line training (for generating, training, and refining a prediction model) and online inferences (for predicting whether a particular member will click on a particular email content item, based on a prediction model).

For example, if the prediction module 204 is utilizing a logistic regression model (as described above), then the regression coefficients of the logistic regression model may be learned through a supervised learning technique from data collected in logs or calculated from log data. Accordingly, in one embodiment, the email response prediction system 200 may operate in an off-line training mode by assembling log data into assembled feature vectors. For example, whenever a member of a social network service performs a particular user action on a particular email content item, various information describing aspects of this interaction (e.g., information describing the member, information describing the email content item, etc.) may be stored as entries in an interaction log. Over time, the log data may include millions or even billions of entries, representing interactions between different members and different email content items. Accordingly, the email response prediction system may access, for example, all the log entries in the past 30 days where various members performed various user actions (e.g., a click or a non-click) on various email content items, and the email response prediction system may convert each of these log entries into an assembled feature vector, based on the various embodiments described herein. For the purposes of training the system 200, the system 200 generally needs both positive training examples of where users performed an action (e.g., click), as well as negative training examples of where users did not perform the action (e.g., non-click). The assembled feature vectors (e.g., the assembled feature vector 510 illustrated in FIG. 5) may then be passed to the prediction module, in order to refine regression coefficients for the logistic regression model. For example, statistical learning based on the Alternating Direction Method of Multipliers technique may be utilized for this task.

Thereafter, once the regression coefficients are determined, the email response prediction system 200 may operate to perform online inferences based on the trained model (including the trained model coefficients) on a single assembled feature vector. For example, according to various exemplary embodiments described herein, the email response prediction system 200 is configured to predict the likelihood that a particular member will perform a particular user action for various email content items, in order to determine which of the various email content items should be displayed to the particular member in the particular context. For example, suppose an online social network service is attempting to determine what type of email (or content within an email) should be sent to a user John Smith. The email response prediction system 200 may predict the likelihood that the particular member John Smith will click on various email content items, such as email content item E1, E2, E3, etc., given the particular context. Thereafter, the email response prediction system 200 may rank the email content items E1, E2, etc., based on how likely it is that the user will perform the user action (e.g., click) on each of the email content items given the particular context. For example, if the likelihood that the member will click on E1 and E3 is low, but the likelihood that the member will click on E2 is high, then email content item E2 may be ranked higher than E1 and E3. Accordingly, the email response prediction system 200 may determine that E2 should be displayed to the member instead of E1 or E3, or that E2 should be displayed higher (or more prominently) than E1 or E3, since the prediction module 204 has determined that the member is more likely to click on E2 than E1 or E3. Accordingly, this online inference process may be performed whenever an email is to be transmitted to a member and a determination is to be made as to what content should be displayed in the email.

Figure 4:
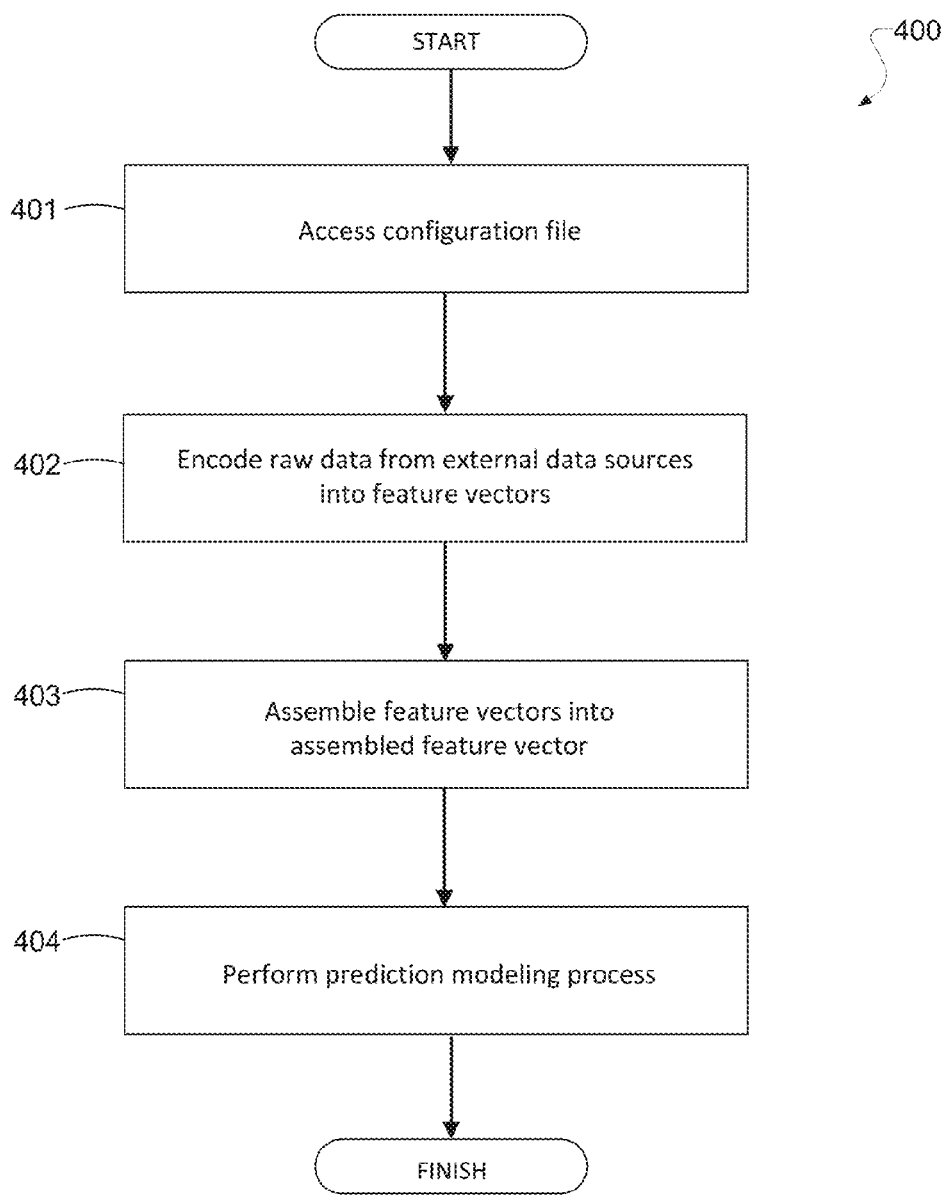
FIG. 4 is a flowchart illustrating an example method, according to various embodiments.

FIG. 4 is a flowchart illustrating an example method 400, according to various exemplary embodiments. The method 400 may be performed at least in part by, for example, the email response prediction system 200 illustrated in FIG. 2 (or an apparatus having similar modules), Operations 401-404 in the method 400 will now be described briefly. In operation 401, the source module 202 accesses email content data describing a particular email content item and member email interaction data describing a particular member's interactions with various email content. In operation 402, the source module 202 encodes the data accessed from the external data sources into one or more feature vectors. In operation 403, the source module 204 assembles the one or more feature vectors to thereby generate an assembled feature vector (see FIG. 5). Finally, in operation 404, the prediction module 204 performs a prediction modeling process based on the assembled feature vector and a prediction model to predict a likelihood of a particular member (e.g., the member described in the raw member data) performing a particular user action on a particular email content item (e.g., the email content item described by the raw email content data). The prediction module 204 may use any one of various known prediction modeling techniques to perform the prediction modeling. For example, the prediction module 204 may apply a statistics-based machine learning model such as a logistic regression model to the assembled feature vector. Each of the aforementioned operations 401-404, and each of the aforementioned modules of the email response prediction system 200, will now be described in greater detail.

Figure 10:
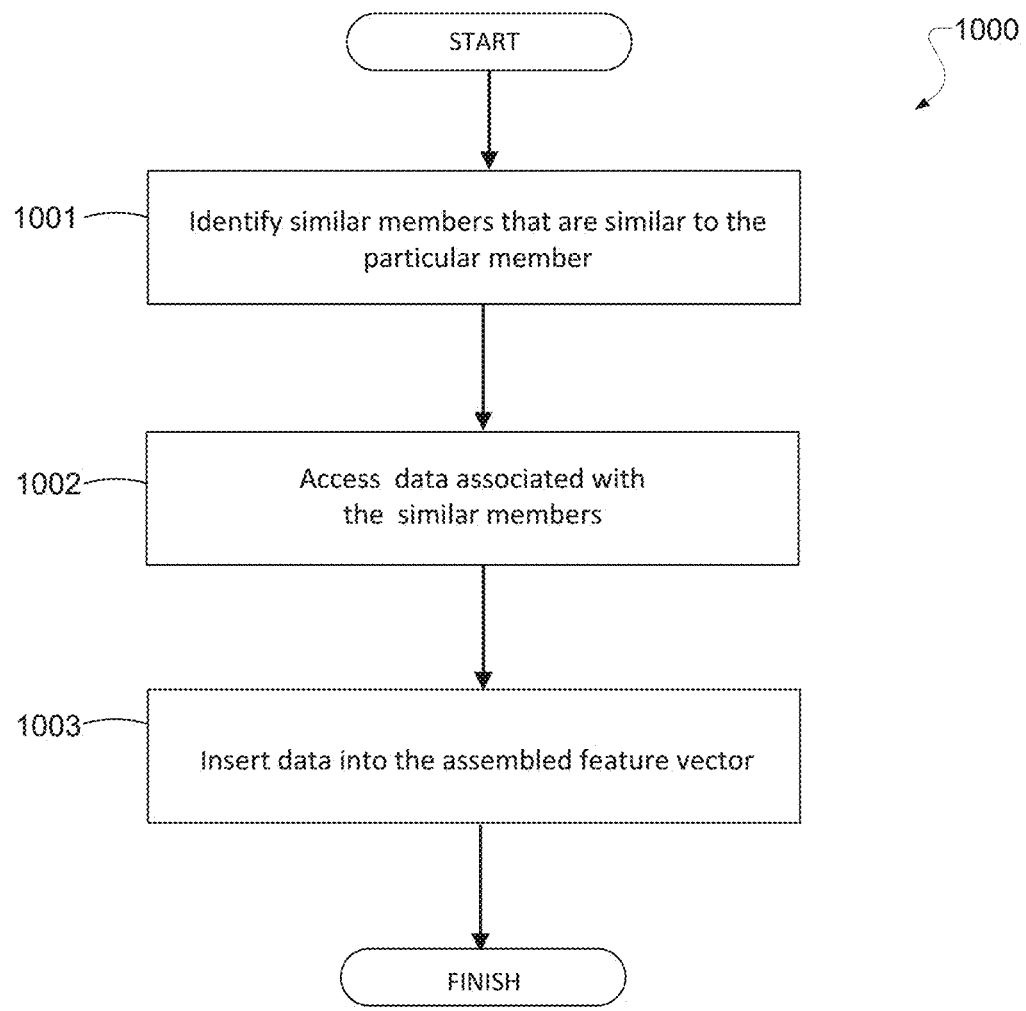
FIG. 10 is a flowchart illustrating an example method, according to various embodiments.

FIG. 10 is a flowchart illustrating an example method 1000, consistent with various embodiments described above. The method 1000 may be performed at least in part by, for example, the email response prediction system 200 illustrated in FIG. 2 (or an apparatus having similar modules, such as client machines 110 and 112 or application server 118 illustrated in FIG. 1). In operation 1001, the source module 202 identifies similar members of the online social network service that are similar to the particular member. In some embodiments; the similar members may be identified by: accessing member profile data associated with the particular member; and determining a match between member profile data associated with the similar members and the accessed member profile data associated with the particular member. In other embodiments, the similar members may be identified by similarities based on other member activities e.g., member site interaction data, member e-mail interaction data, etc.), or based on similarities in the connections of the members, and so on. In operation 1002, the source module 202 accesses at least one of member profile data, member email interaction data, and member site interaction data associated with the one or more similar members. In operation 1003, the source module 202 inserts at least one of the member profile data, the member email interaction data, and the member site interaction data associated with the one or more similar members into the assembled feature vector. It is contemplated that the operations of method 1000 may incorporate any of the other features disclosed herein.

Figure 11:
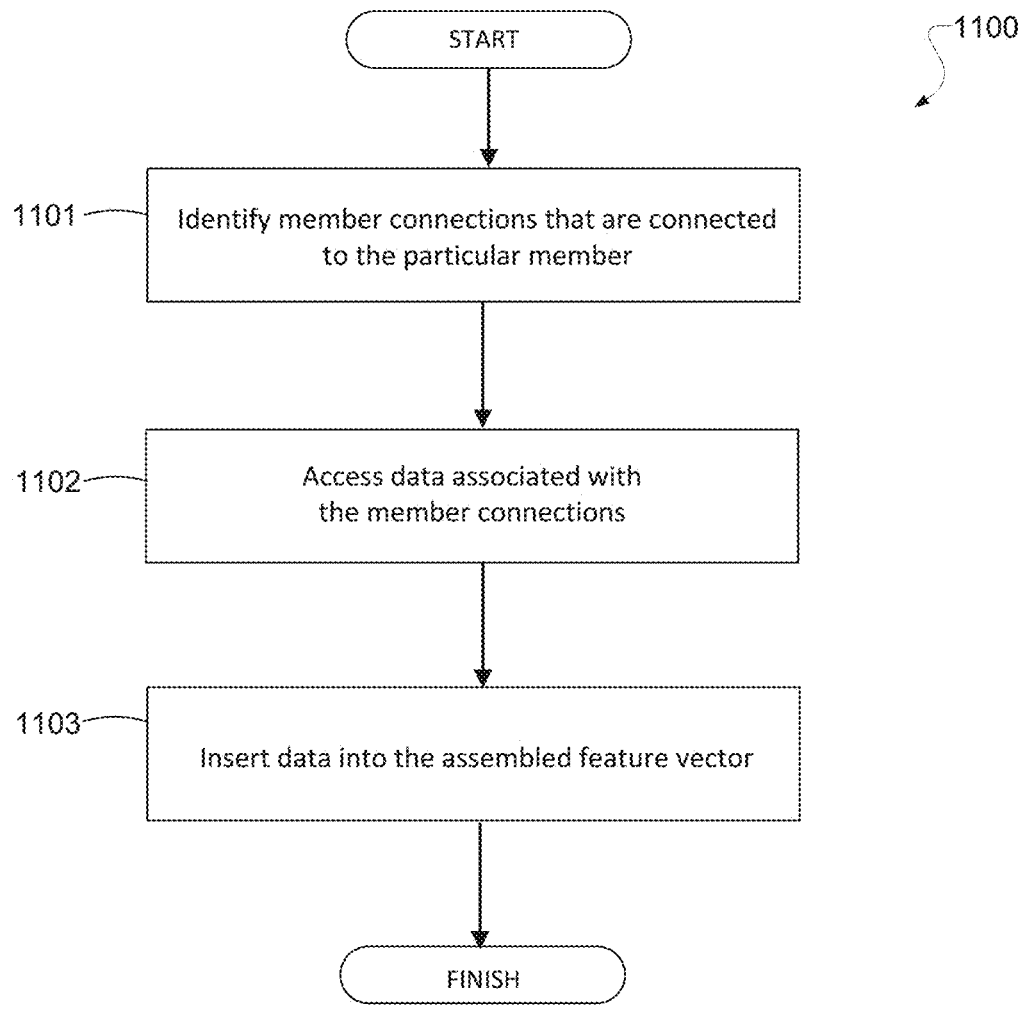
FIG. 11 is a flowchart illustrating an example method, according to various embodiments.

FIG. 11 is a flowchart illustrating an example method 1100, consistent with various embodiments described above. The method 1100 may be performed at least in part by, for example, the email response prediction system 200 illustrated in FIG. 2 (or an apparatus having similar modules, such as client machines 110 and 112 or application server 118 illustrated in FIG. 1). In operation 1101, the source module 202 identifies member connections that are connected to the particular member via the online social network service. In operation 1102, the source module 202 accesses at least one of member profile data, member email interaction data, and member site interaction data associated with the one or more member connections. In operation 1103, the source module 202 inserts at least one of the member profile data, the member email interaction data, and the member site interaction data associated with the one or more member connections into the assembled feature vector. It is contemplated that the operations of method 1100 may incorporate any of the other features disclosed herein.

In some embodiments, after the prediction module 204 determines the likelihood that a particular member performs a particular user action (e.g., clicks, opens, views, etc.) on an e-mail content item (e.g., a particular type of e-mail such as a network update e-mail, jobs update e-mail, a news update e-mail, etc.), the email management module 206 of the email response prediction system 200 may compare the likelihood with various predetermined thresholds, in order to adjust, downshift, or refine the quantity, frequency, and type of e-mails being transmitted to the particular member.

In some embodiments, if the predicted likelihood is lower than a predetermined threshold (e.g., indicating that the particular member is not likely to click on that e-mail content item), then the email management module 206 may reduce the distribution of that type of e-mail content item to the particular member. For example, in some embodiments, the email management module 206 may adjust e-mail preference settings associated with the particular member (e.g., see FIG. 12) to cause the reduction in the distribution of that particular type of e-mail content item to the particular member. For example, in some embodiments, the email management module 206 may reduce the frequency of that particular type of e-mail from being transmitted to the member (e.g., from daily to weekly or monthly, etc.). In some embodiments, the email management module 206 may temporarily prevent that e-mail type from being transmitted to the member e.g., the email management module 206 may prevent the next X e-mails of that type from being transmitted to the member, or the email management module 206 may prevent that e-mail type from being transmitted to the member for a given time period, such as the next week, or month, or six months, etc.). In some embodiments, the email management module 206 may automatically unsubscribe the user from that type of e-mail. In some embodiments, the email management module 206 may reduce a quantity of that e-mail content item within an e-mail message (e.g., only 2 news items per e-mail instead of 10 news items per e-mail), The 206 may reduce this quantity of e-mail content type either temporarily or indefinitely (e.g., until the user changes the appropriate settings in their e-mail preference settings).

In the case of a digest e-mail (which may include network updates, news updates, influencer posts, group updates, etc.), if the prediction module 204 determines that the likelihood that the particular member will perform the user action on that e-mail content item is lower than a specific threshold, then the email management module 206 may reduce the distribution of that particular content item in the digest e-mails. For example, the email management module 206 may remove the e-mail content type from the digest e-mail indefinitely (e.g., until the user changes the appropriate settings in their e-mail preference settings). As another example, the email management module 206 may remove the e-mail content type from the digest e-mail temporarily (e.g., for the next X digest e-mails, or for a given time period, such as the next week, or month, or six months, etc.). As another example, the email management module 206 may reduce a quantity of that e-mail content item within the digest e-mail message (e.g., only two news items per digest e-mail instead of 10 news items per digest e-mail). As another example, the email management module 206 may reorder the contents of the digest email, placing email content item lower or less prominently in the digest email.

In some embodiments, if the likelihood is higher than a predetermined threshold (e.g., indicating that the particular member is likely to click on that e-mail content item), then the email management module 206 may maintain or increase the distribution of that type of e-mail content item to the particular member. For example, in some embodiments, the email management module 206 may adjust e-mail preference settings associated with the particular member (e.g., see FIG. 12) to cause the increase in the distribution of that particular type of e-mail content item to the particular member. For example, in some embodiments, the email management module 206 may maintain or increase the frequency of that particular type of e-mail from being transmitted to the member (e.g., from monthly to weekly or daily, etc.). In some embodiments, the email management module 206 may automatically subscribe the user for distribution of that type of e-mail (e.g., if the user was not already subscribed to that type of e-mail). In some embodiments, the email management module 206 may increase a quantity of that e-mail content item within an e-mail message (e.g., from 2 news items per e-mail instead to 10 news items per e-mail). The 206 may increase this quantity of e-mail content type either temporarily or indefinitely (e.g., until the user changes the appropriate settings in their e-mail preference settings).

In the case of a digest e-mail (which may include network updates, news updates, influencer posts, group updates, etc.). In such cases, if the prediction module 204 determines that the likelihood that the particular member will perform the user action on that e-mail content item is higher than a specific threshold, then the email management module 206 may maintain or increase the distribution of that particular e-mail content item in the digest e-mails. For example, the email management module 206 may include that email content item type in the digest emails to the member (e.g., if this was not already the case). As another example, the email management module 206 may increase a quantity of that e-mail content item within the digest e-mail message (e.g., from two news items per digest e-mail to 10 news items per digest e-mail). As another example, the email management module 206 may reorder the contents of the digest email, placing email content item higher or more prominently in the digest email.

In some embodiments, the email response prediction system may be utilized for portfolio optimization processes (e.g., where the e-mail response prediction system adjusts various aspects of e-mail distribution to conform to members interests holistically). For example, the prediction module 204 may utilize the calculated likelihoods for the purposes of e-mail portfolio optimization by placing more or less restrictions on the amounts, type, characteristics, and so on, e-mails sent to one or more members of an online social network. For example, the prediction module 204 may limit the total number of e-mails per member, and/or maintain a global click through rate (CTR) across all e-mails or e-mails of a particular type, and/or limit a number of e-mails sent to members per e-mail type (e.g., job-related e-mails), and so on. Thus, the email response prediction system may adjust the frequency of email distribution via thresholds (as described elsewhere herein) or via a more holistic approach where a number of parameters can be optimized simultaneously, or a number of different constraints can be enforced simultaneously. In particular, in some embodiments, the e-mail response prediction system may generate and maintain e-mail portfolio optimization information per member. For example, based on particular member's interests and inferred intent, the system 200 may choose a set of e-mails every week to send to a member. As another example, the system 200 may make sure that the particular member does not receive more than five e-mails per week (and based on this constraint, the system 200 may either upshift or downshift the number of emails sent to the member, but will make sure they receive the most relevant e-mails). Another example of a constraint is that whomever receives email type 1 doesn't get e-mail type 2, and so on. Thus, it is understood that the system 200 may utilize a more holistic approach where different types of constraints may be enforced simultaneously.

Figure 13:
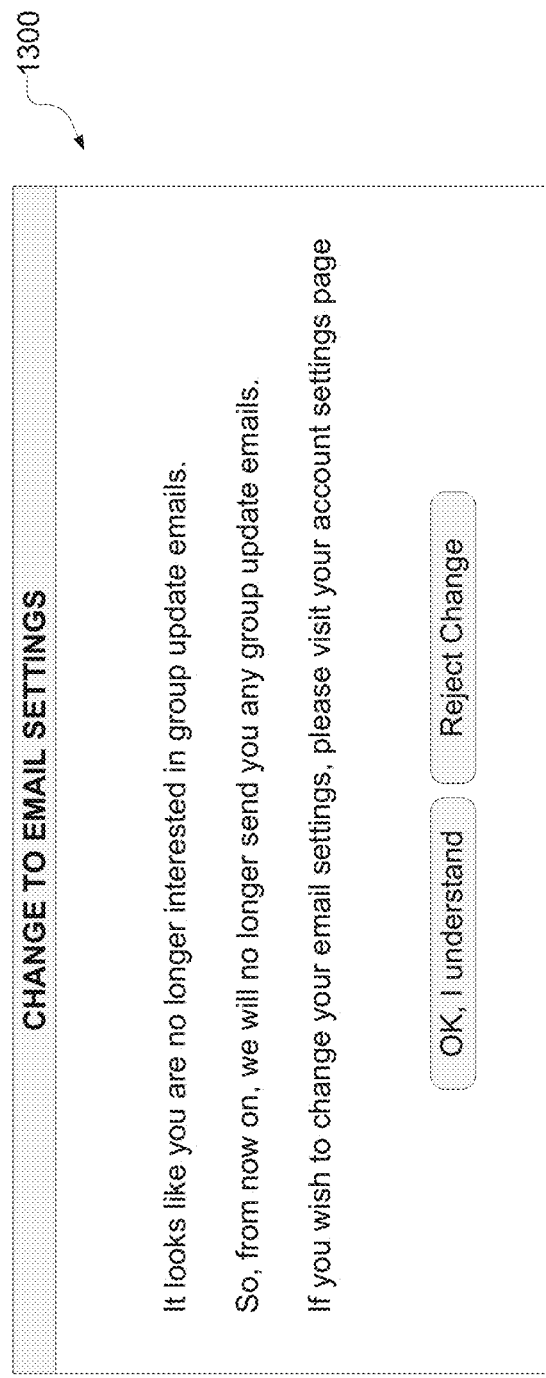
FIG. 13 illustrates an exemplary portion of a user interface, according to various embodiments.

In some embodiments, when the email management module 206 adjusts the e-mail settings of a member (e.g., reducing or preventing the distribution of certain e-mail type to a member), the email management module 206 may display a prompt informing the user that the e-mail settings have been changed (e.g., see FIG. 13) and allowing the user to reject the change. In other embodiments, the email management module 206 may automatically adjust e-mail settings of the member (consistent with various embodiments described herein), without displaying the aforementioned prompt or the user. In some embodiments, the email management module 206 may request user authorization to adjust the e-mail settings of the member (e.g., via a query prompt displayed in the user interface), before proceeding to adjust e-mail settings of the member.

According to various exemplary embodiments, the email response prediction system 200 may display the user interface allowing a member to adjust their e-mail preferences/settings. For example, the email management module 206 may display the user interface 1200 illustrated in FIG. 12. As illustrated in FIG. 12, the email management module 206 may display a prompt indicating that the email management module 206 has automatically adjusted the e-mail preferences of the user, consistent with various embodiments described herein.

Figure 14:
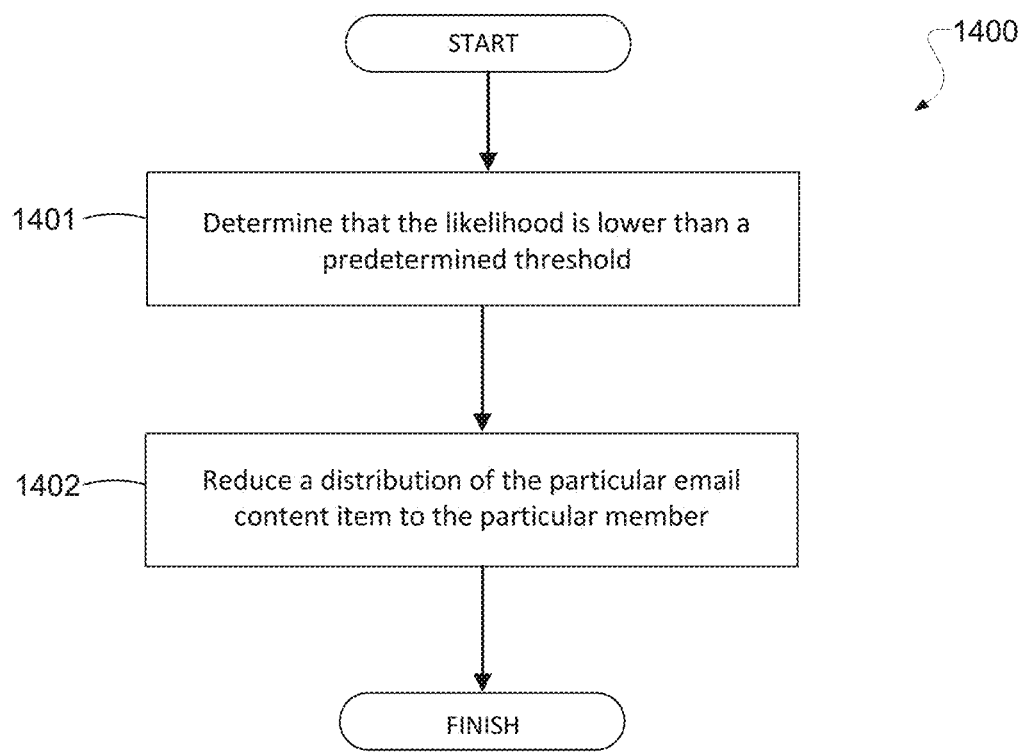
FIG. 14 is a flowchart illustrating an example method, according to various embodiments.

FIG. 14 is a flowchart illustrating an example method 1400, consistent with various embodiments described above. The method 1400 may be performed at least in part by, for example, the email response prediction system 200 illustrated in FIG. 2 (or an apparatus having similar modules, such as client machines 110 and 112 or application server 118 illustrated in FIG. 1). In operation 1401, the email management module 206 determines that the likelihood of the particular member performing the particular user action on the particular email content item is lower than a predetermined threshold. In operation 1402, the email management module 206 reduces a distribution of the particular email content item to the particular member. In some embodiments, the email management module 206 may update email preference settings associated with the particular member, the updated email preference settings specifying a reduced quantity or frequency of the particular email content item for distribution to the particular member. For example, the email management module 206 may reduce a quantity of the particular email content item included in an e-mail for distribution to the particular member. As another example, the email management module 206 may reduce a frequency of the particular email content item for distribution to the particular member. As another example, the email management module 206 may temporarily prevent the particular email content item from being distributed to the particular member. As another example, the email management module 206 may unsubscribe the particular member from a distribution of the particular email content item. Each of the aforementioned results may be associated with a different predetermined threshold (e.g., if the likelihood is less than a first higher threshold, then temporarily prevent the member for receiving that e-mail content item, resident likelihood is less than a second lower threshold, then automatically unsubscribed the particular member from distribution of that particular e-mail content item), It is contemplated that the operations of method 1400 may incorporate any of the other features disclosed herein.

Figure 15:
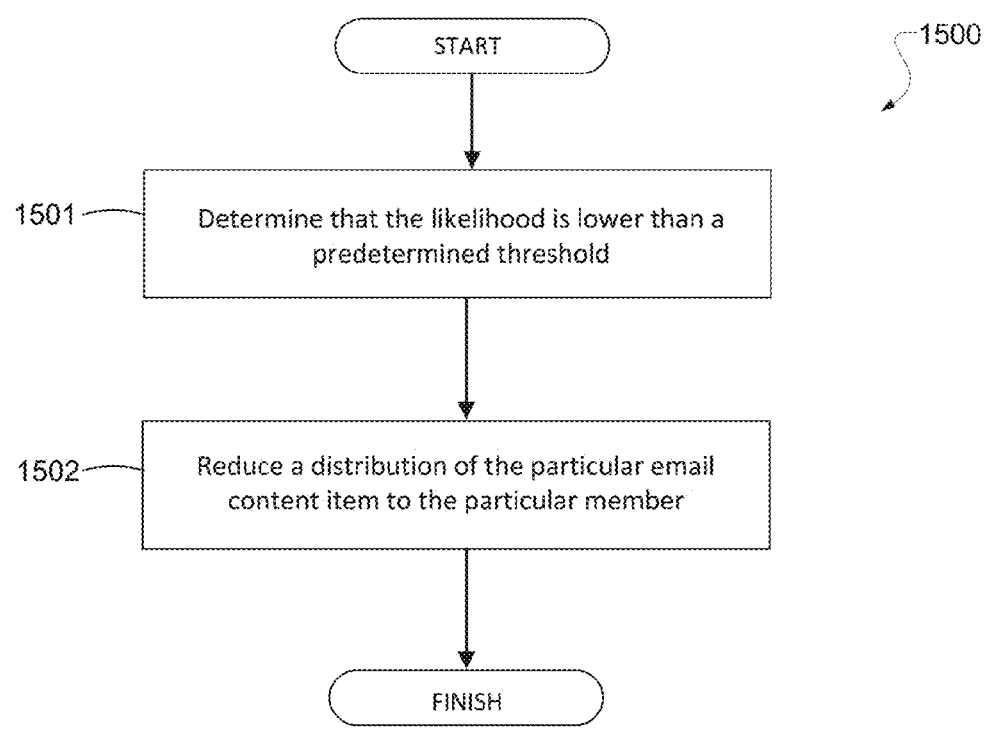
FIG. 15 is a flowchart illustrating an example method, according to various embodiments.

FIG. 15 is a flowchart illustrating an example method 1500, consistent with various embodiments described above. The method 1500 may be performed at least in part by, for example, the email response prediction system 200 illustrated in FIG. 2 (or an apparatus having similar modules, such as client machines 110 and 112 or application server 118 illustrated in FIG. 1). In operation 1501, the source module 202 determines that the likelihood of the particular member performing the particular user action on the particular email content item is greater than a predetermined threshold. In operation 1502, the source module 202 increases a distribution of the particular email content item to the particular member. For example, in some embodiments, the email management module 206 may increase a quantity of the particular email content item included in an e-mail for distribution to the particular member. As another example, the email management module 206 may increase a frequency of the particular email content item for distribution to the particular member. Each of the aforementioned results may be associated with a different predetermined threshold (e.g., if the likelihood is greater than a first lower threshold, then increase the quantity of the e-mail content item in a digest e-mails, and if the likelihood is greater than a second higher threshold, then increase the frequency of the particular e-mail content item for distribution to the particular member), It is contemplated that the operations of method 1500 may incorporate any of the other features disclosed herein.

In some embodiments, the system 200 may take into account a relevance of the email content, considering the member's profile (skills, past experience, seniority level, function area etc.). In some embodiments, for the representation of the features, the system 200 use a number of techniques, including computing confidence intervals based on historical actions (depending on their distribution, e.g., binomial distribution, etc.) and use the boundary values as features.

Figure 16:
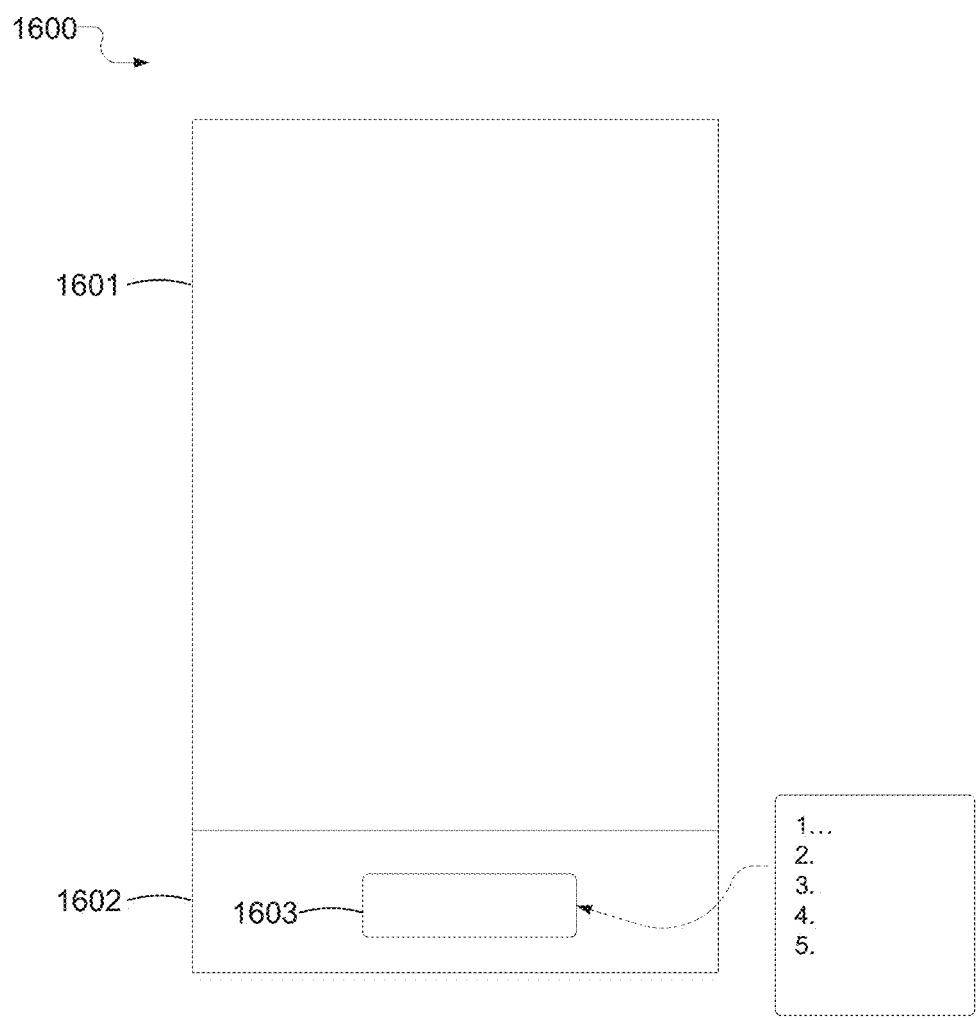
FIG. 16 illustrates an exemplary e-mail message, according to various embodiments.

As described in various embodiments above, some e-mails (such as personalized digest e-mails) may include various types of content therein. In some embodiments, a particular e-mail (such as a digest e-mail) may include a specific portion of content (e.g., at the bottom of the e-mail) that may be referred to as "promotion content" or "sample content" that displays information about a particular product or service, such as a product or service associated with an online social network service (e.g., a "people you may know", "a network update stream" product on the LinkedIn social network service). Thus, the promotion content may be similar to an advertisement and may be configured to promote (or provide a user with a sample of) different types of products and services of the online social network service. For example, FIG. 16 illustrates an exemplary e-mail 1600 (e.g., digest e-mail), where the e-mail 1600 includes a main portion 1601 with one or more pieces of content, as well as a lower portion 1602 that includes promotion content 1603. Such promotion content may be included in any type of e-mail, such as network update e-mails, content to digest e-mails group digest e-mails, and so on, in order to encourage users to become engaged with various products on LinkedIn or another website or service. It is understood that an email may include multiple instances of promotion content anywhere in the email (and not necessarily at the bottom of the email).

Accordingly, the framework and techniques described in various embodiments herein may be utilized to find what piece of promotion content makes more sense for each e-mail and/or for each user. More specifically, the e-mail response prediction system may be utilized to determine the particular type and form of promotion content 1603 that is most appropriate to include in a particular e-mail having other types of content, consistent with various embodiments described herein. For example, the e-mail content response prediction system may predict that, if the member is more likely to be engaged with this type of product, the system 200 may determine that promotion content related to that type of product should be included in the e-mail. As another example, if the email content response prediction system determines that users viewing email s already including content types A, B, and C are more likely to be interested in content related to D, but not content related to E, the system 200 may choose promotion content related to D as appropriate. More specifically, for a given slot/position in given e-mail type, the e-mail response prediction system is configured to rank n number of external sources of content (that were not originally part of that e-mail) and to choose one or more of the external sources of content to be displayed as the promotion content 1603, as illustrated in FIG. 16. And depending on the type of e-mail or the content included in the email, this ranked list will change. For example, sometimes a particular piece of promotion content will not make sense a given type of e-mail (e.g., if other more detailed content related to the same product is already included in the email). Thus, it is understood that various embodiments described here may be applied to selecting promotion content to include in an e-mail.

As described above, various features, such as email activities, other activities on site (e.g., page views, searches, etc.), social network activities, context (hour of day, mobile, geo, etc.), member profile data, member connections, similar members features, and so on, may be tied into and defined in feature vectors. In alternative embodiments, the system 200 may not necessarily use all of the features as part of a vector, and instead may utilize them in a slightly different manner, such as to train different models in a segmented model approach. This may be advantageous because it is possible that there are some features that change the model behavior dramatically. For example, suppose the behavior of jobseekers may be dramatically different from that of other users on LinkedIn®. Accordingly, if the system 200 trains a model using examples only from job seekers, the model behavior may be highly specialized because the behavior of jobseekers is, in this example, dramatically different from that of other members. But if the system 200 includes both job seekers and non-job seekers together, the overall model performance may not be as successful at predicting the responses of job-seekers and non-job-seekers with their own specialized models. Thus, the email response prediction system 200 may utilize a segmented model approach, where data is split based on some criteria features of job-seekers vs. features of non-jobseekers), and separate models are trained for different data sets (e.g., features of job-seekers vs. features of non-jobseekers).

Figure 17:
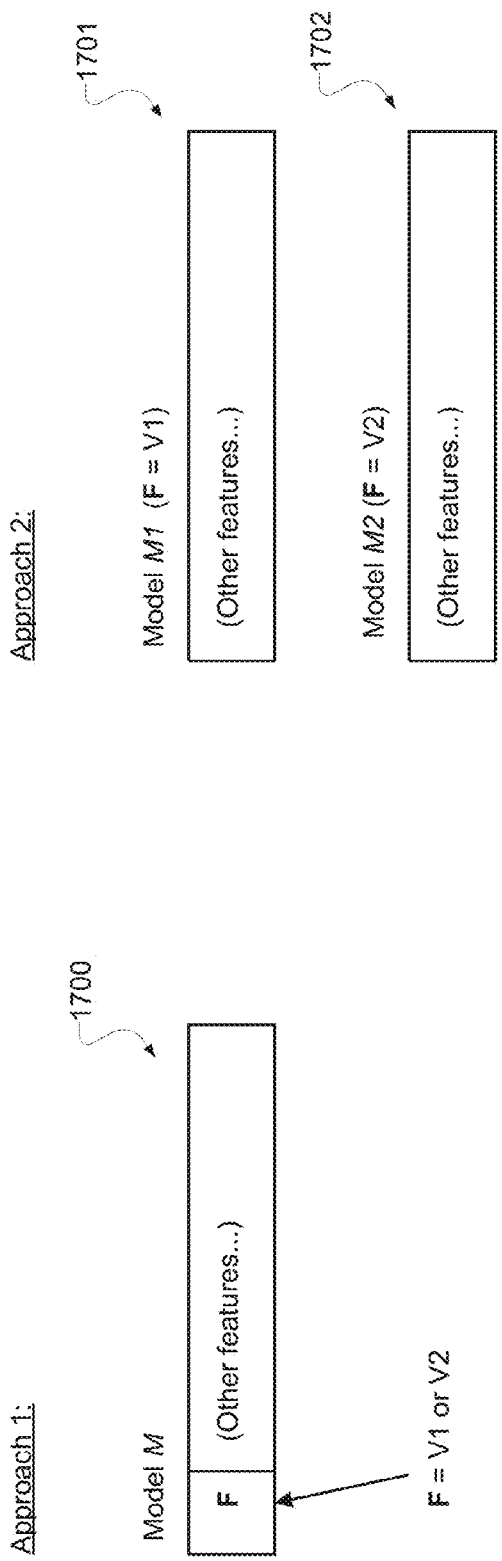
FIG. 17 illustrates various aspects of a segmented model approach; according to various embodiments.

FIG. 17 illustrates examples of an inclusive vector approach 1 and a segmented model approach 2. In approach 1, a model M may be trained based on a feature vector 1700 including a feature F (e.g., job seeker status), which may have either a value V1 (e.g., user is a job seeker) and a value V2 (e.g., user is not a job seeker), as well as other features in addition to Feature F. Thus, in approach 1, all the features of both job-seekers and non-job seekers as well as an feature F indicating whether a member is a job-seeker or not) are included in a vector 1700, In contrast, in approach 2, the data for job-seekers is separated and included in the vector 1701 associated with Model M1, whereas the data for non-job seekers is separated and included in the vector 1702 for Model M2, and each model M1 and M2 is trained separately. Thus, in approach 2, all the data examples for job-seekers are included in a first model M1 and all the data examples for non-job-seekers are included in a second model M2, and each model is trained separately. In some cases, the overall performance may be better with this approach, particularly if the behavior of job-seekers and non-job seekers is dramatically different. For example, when a new member joins a network, the system 200 may determine if the member is a job seeker and, if so, the system 200 may utilize model M1 to predict that new member's behavior, (whereas the system 200 may utilize model M2 if that new member is not a job seeker). The example of job-seekers described here is merely exemplary, and it is understood that such a segmented model approach may be utilized for any other feature (e.g., members viewing from a mobile device versus members viewing from a PC, members with a regular subscription versus members with a premium subscription, etc.). Thus, it is understood that while the system 200 may include all features or a subset of all features in vectors, such information does not necessarily have to be used as features in a vector but can also be used in a different manner (e.g., a segmented model approach).

Various techniques and embodiments described herein may be applied in the context of a Delivery Time Optimization (MD) process or campaign. For example, the email response prediction system 200 may identify when would be the best time to deliver/send email(s) to members in accordance with DTO, in order to improve the response rate (clicks, conversions, etc.) to the email(s) by sending the email(s) at the most appropriate time. For example, the email response prediction system 200 may predict a personalized delivery time (which could be in the form of day-of-week and/or hour-of-day value, etc.) for a given member and email pair. The email response prediction system 200 may utilize a member's profile data (context information, geolocation information, access time information, etc), as well as a member's historical activities on emails and on the site, and any other features as described herein, in order to predict the aforementioned personalized delivery time. In a case where there are multiple emails to send in a given time window (e.g., mails selected in connection with an email portfolio optimization process, as described in various embodiments herein), the email response prediction system 200 may predict when exactly to send such emails.

For example, as described herein, the email response prediction system 200 is configured to predict a likelihood of a particular user X performing a particular user action Y on a particular message content item Z. According to various embodiments, the email response prediction system 200 may utilize this approach to determine the optimum personalized delivery time to transmit a message to a particular member of an online social network service. For example, in some embodiments, the email response prediction system 200 may determine, for each of a plurality of time intervals, a likelihood of a particular member of an online social network service performing a particular user action on a particular message content item during the corresponding time interval. The plurality of time intervals may then be ranked, based on the determined likelihoods corresponding to the plurality of time intervals. Thereafter, a particular time interval that is associated with a highest ranking may be identified from among the plurality of time intervals. The particular time interval may then be classified as an optimum personalized message delivery time for the particular member.

Figure 18:
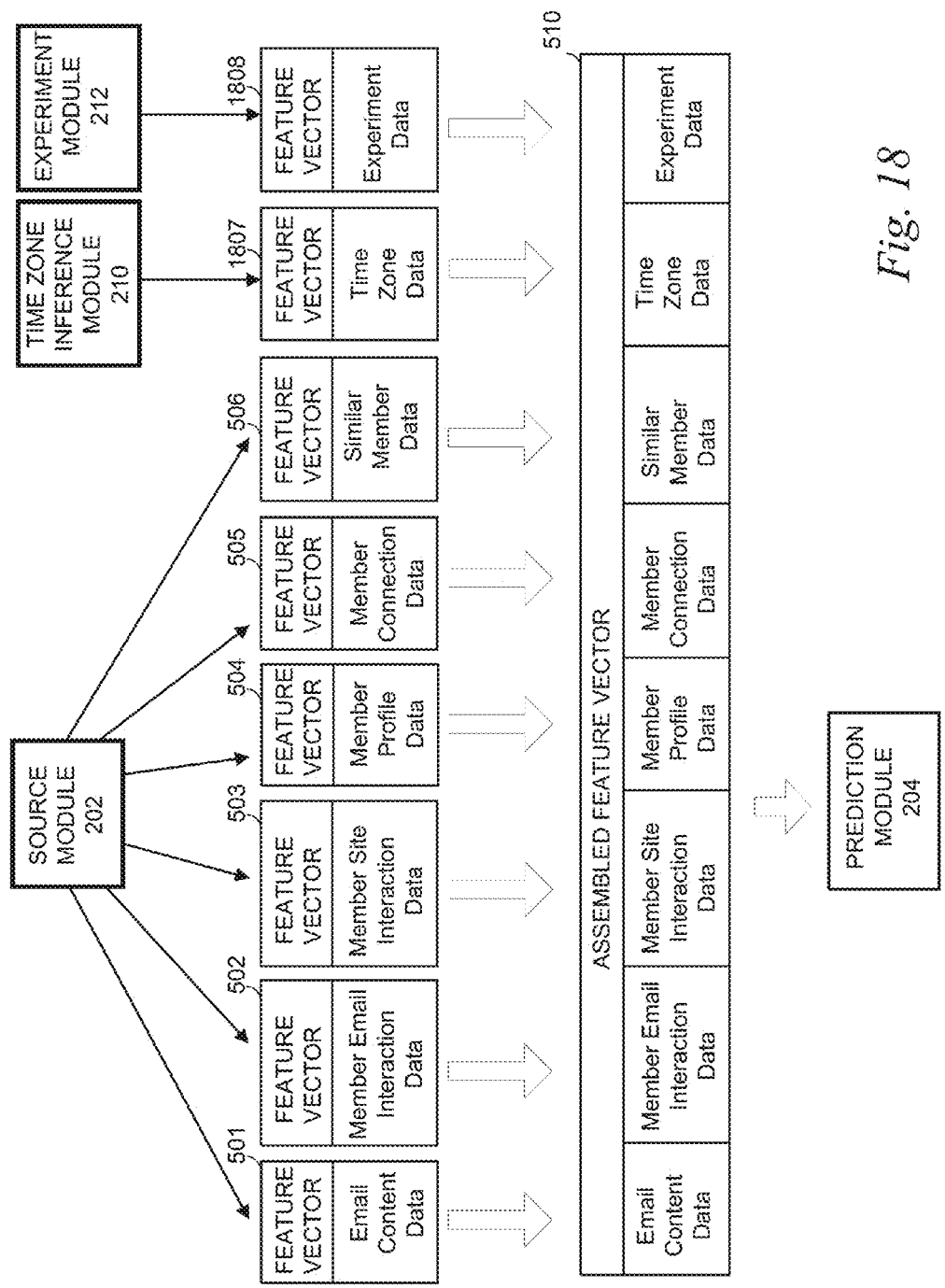
FIG. 18 illustrates an exemplary data flow, according to various embodiments.

In some embodiments, one of the features utilized in predicting the likelihood that a member will interact with a message content item is the current time zone of the member (i.e., the time zone associated with the current location of the member). For example, the email response prediction system 200 may include a time zone inference module 210 (see FIG. 2) configured to determine the current time zone of the member. The operation of the time zone inference module 210 is described in greater detail below. Thus, a time zone feature e.g., a numerical value indicating a time zone associated with a given member) may then be input into a feature vector for the purposes of performing prediction modeling, consistent with various embodiments described herein. For example, with reference to FIG. 5, such feature(s) may be included in the feature vector 504 including the member profile data. Alternatively, as illustrated in FIG. 18, such time zone feature(s) may be included in a separate time zone feature vector 1807 that may be passed into the assembled feature vector 510, consistent with various embodiments described herein.

Time zone feature(s) may be useful for determining the likelihood that a particular member in a particular time zone will perform a particular user action on a particular message content item, since such features may be utilized to identify trends of how other members located in a particular time zone responded to e-mails. For example, it may be the case that most users in a particular time zone (e.g., the Pacific time zone (PST)) tend to respond strongly to e-mails in the afternoon, local PST, whereas most users in another time zone (e.g., China standard Time zone (CST)) tend to respond more strongly to e-mails in the morning, local CST. Thus, the prediction models described herein may be trained on a time zone feature in conjunction with various other features described herein, in order to determine the weight or relevance of such features in predicting how likely it is the user will interact with a particular content item during a particular time interval. For example, the prediction models described herein may be trained based on training data indicating how members located in each time zone have interacted with e-mail content during various local times of the day, Thus, when performing an online inference to determine the likelihood that a particular member located in a particular time zone will interact in some manner with a particular content item, the historical interactions by other members in that time zone may be utilized in the prediction modeling.

In some embodiments, one of the features utilized in predicting the likelihood that a member will interact with a message content item is experimental data indicating the results of various e-mail response experiments. For example, the email response prediction system 200 may include an experiment module 212 configured to transmit messages to a plurality of members at various local times (e.g., times of the day) and analyze the response to the messages. For example, the experiment module 212 may send messages to users in each location at different (e.g., random or fixed) times of the day, and by analyzing how the users interact with the transmitted e-mails, the experiment module 212 may determine which times of the day produce the best responses to the messages (e.g., as measured by click through rates) in that time zone. The operation of the experiment module 212 is described in greater detail below. Such experiment features (e.g., numerical values indicating message experiment response metrics associated with each of various locations or time zones) may then be input into a feature vector for the purposes of performing prediction modeling, consistent with various embodiments described herein. For example, with reference to FIG. 5, such feature(s) may be included in the feature vector 502 including the member e-mail interaction data. Alternatively, as illustrated in FIG. 18, such experiment feature(s) may be included in a separate experiment data feature vector 1808 that may be passed into the assembled feature vector 510, consistent with various embodiments described herein.

The experimental feature(s) described above may be useful for determining the likelihood that a particular member will perform a particular user action on a particular e-mail content item, since such features may be utilized to identify trends of how other members located in a particular time zone have responded to e-mails during experiments.

For example, it may be the case that most users in a particular geographic location have responded strongly to e-mails in the afternoon in response to the experiments described herein, whereas most users in another location have responded more strongly to e-mails in the morning in response to the experiments described herein. Thus, the prediction models described herein may be trained on experiment feature data in conjunction with various other features described herein, in order to determine the weight or relevance of such features in predicting how likely it is the user will interact with a particular content item during a particular time interval. For example, the prediction models described herein may be trained based on training data indicating experiment response metrics associated with members located in each time zone. Thus, when performing an online inference to determine the likelihood that a particular member located in a particular time zone will interact in some manner with a particular content item, the experimental results indicating interactions by other members in that time zone may be utilized in the prediction modeling.

In some embodiments, the flow illustrated in FIG. 18 may be performed in connection with each time zone. For example, the prediction module 204 may be trained based on training data associated with members in the particular time zone (e.g., the features included in the vectors 501-506, 1807, and 1808 may be associated with members located in a particular time zone), in order to generate a model optimized for that particular time zone. In some embodiments, a single prediction module 204 may perform the modeling for each time zone. In other embodiments, multiple prediction modules 204 may be provided, with each prediction module performing modeling for a given time zone.

Figure 19:
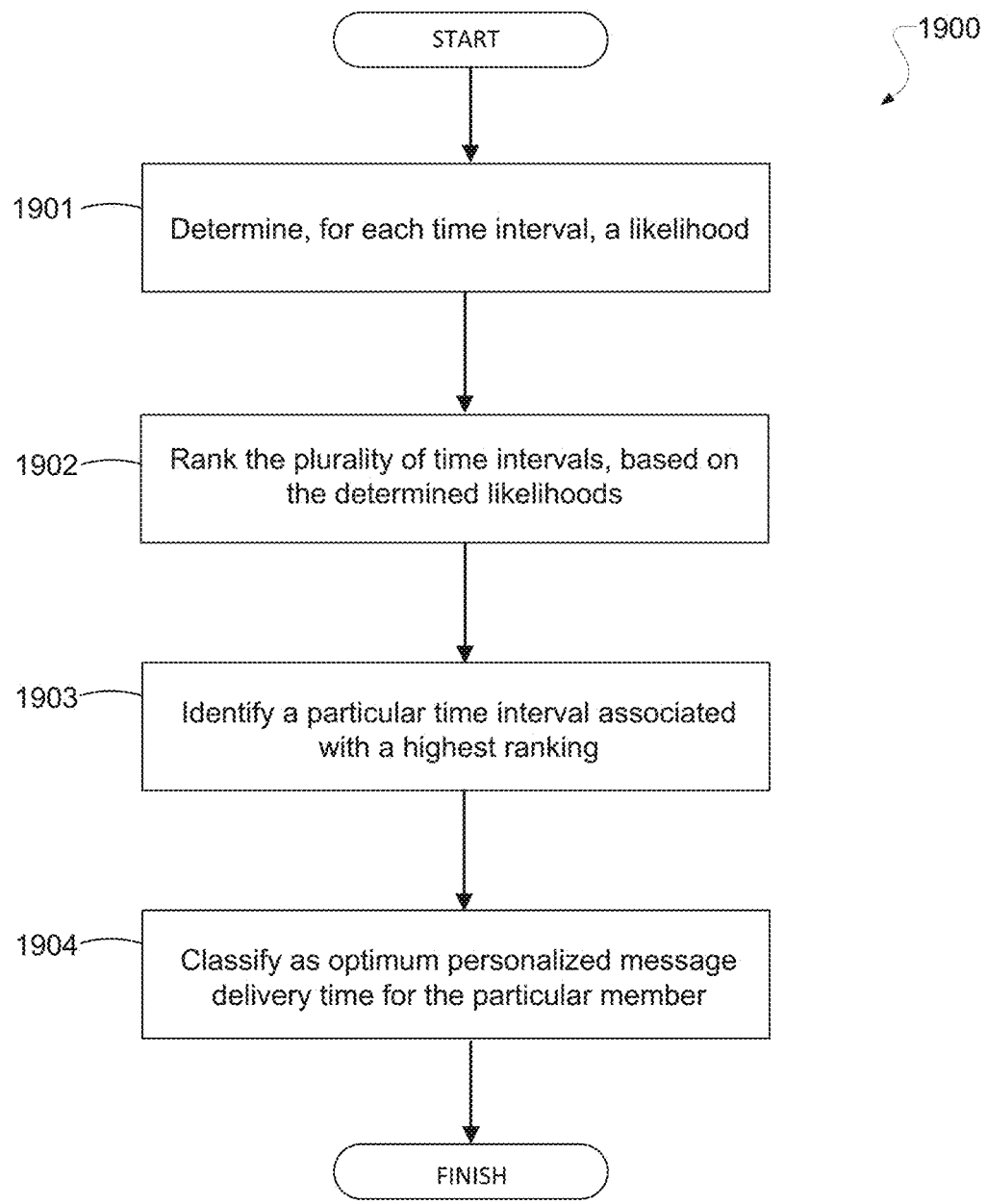
FIG. 19 is a flowchart illustrating an example method, according to various embodiments.

FIG. 19 is a flowchart illustrating an example method 1900, consistent with various embodiments described above. The method 1900 may be performed at least in part by, for example, the email response prediction system 200 illustrated in FIG. 2 (or an apparatus having similar modules, such as one or more client machines or application servers). In operation 1901, the prediction module 204 determines, for each of a plurality of time intervals, a likelihood of a particular member of an online social network service performing a particular member user action on a particular message content item during the corresponding time interval. In some embodiments, the message content item corresponds to at least one of an email message, a text message, a social network instant message, and a chat message. In some embodiments, each of the plurality of time intervals corresponds to a particular hour of the day. In some embodiments, each of the plurality of time intervals corresponds to a particular day of the week. The time interval could also be any other time interval, such as an interval measured in seconds, minutes, days, weeks, months, seasons, etc.

In operation 1902, the prediction module 204 ranks the plurality of time intervals, based on the determined likelihoods corresponding to the plurality of time intervals. For example, the time interval associated with the highest likelihood may be ranked highest/first, the time interval associated with the second highest likelihood may be ranked second, and so on. In operation 1903, the prediction module 204 identifies a particular time interval from among the plurality of time intervals that is associated with a highest ranking. For example, if each of the time intervals corresponds to a particular hour of the day, then the prediction module 204 will identify the hour of the day when the particular member is most likely to perform the particular user action on the message content item. In operation 1904, the prediction module 204 classifies the particular time interval as an optimum personalized message delivery time for the particular member. For example, if the time interval associated with the highest likelihood is 2-3 pm, then the optimum personalized message delivery time may be set to 2-3 pm. Alternatively, the optimum personalized message delivery time may be set to a particular time or smaller time interval within the relevant time interval (e.g., 2:30 PM), or another time interval that is associated with the relevant time interval (e.g., the preceding hour, such as 1-2 PM), or a greater time interval that includes the relevant time interval (e.g., 1-5 PM, etc.). Thereafter, the prediction module 204 may adjust message delivery preferences associated with the particular member to indicate the optimum personalized message delivery time. Further, the prediction module 204 may transmit a message to the particular member at the optimum personalized message delivery time, based on the updated message delivery preferences associated with the particular member. It is contemplated that the operations of method 1900 may incorporate any of the other features disclosed herein. Various operations in the method 1900 may be omitted or rearranged, as necessary.

Time Zone Inference Module 210

According to various example embodiments, the time zone inference module 210 is configured to determine a time zone in which a user (e.g., a member of an online social network service) is located.

For example, in accordance with one example embodiment, the time zone inference module 210 may utilize a combination of member profile attributes and IP address login information associated with a member in order to determine the current time zone of the member. For example, the time zone inference module 210 may first analyze member profile attributes of the member in order to determine if they are currently located in a particular country. For example, the time zone inference module 210 may identify whether a user-specified country attribute identifying a particular country is defined in the member profile information of the member (e.g., as a result of the member specifying their current country of residence when they opened a member account on the online social network service). Thereafter, the time zone inference module 210 may access publicly available time zone information indicating time zones associated with each of a plurality of countries. If the time zone inference module 210 determines that a single time zone is associated with the particular country, the time zone inference module 210 may determine that the member is currently located in that single time zone. On the other hand, if the time zone inference module 210 determines that multiple time zones are associated with the particular country, then the time zone inference module 210 may access the last IP address associated with the last member login request from that member (e.g., from the last time that member logged into a website). Based on this IP address, the time zone inference module 210 may determine a geographic location (e.g., a city) associated with the IP address, and a time zone associated with that geographic location, in order to ultimately identify the specific time zone (from among the multiple time zones in that country) that the particular member is currently located in.

According to various example embodiments, the time zone inference module 210 may utilize any one of various factors in order to determine the current time zone of the member. For example, the time zone inference module 210 may analyze member profile attributes associated with the member (e.g., a user-specified country attribute, a current employer attribute, a current educational attribute, etc.). For example, as described above, the time zone inference module 210 may determine that the member is likely located in a particular geographic location based on a user-specified country attribute or contact information defined in the member profile information of the member (e.g., as a result of the member specifying their current country or contact information when they opened a member account on the online social network service), As another example, the time zone inference module 210 may determine that a particular member is currently located in a particular geographic location, if a current education attribute included in the member profile associated with that particular member indicates an educational institution located in the particular country. As another example, the time zone inference module 210 may determine that a particular member is currently located in a particular geographic location, if a current employer attribute included in the member profile associated with that particular member indicates an employer located in that geographic location. Examples of member profile attributes include, without limitation, name, title, industry, geographic location, contact information, current employer, previous employer, current educational in previous educational institution, degree, skills, recommendations, endorsements, company size, seniority level, and so on. The time zone inference module 210 may then identify a time zone associated with a geographic location (based on publically available data indicating correspondences between geographic locations and time zones), and determine that the member is currently located in that particular time zone.

In some embodiments, the time zone inference module 210 may also take into account member behavioral activity, such as interactions or social activity information posted in connection with various products or features of a website (e.g., the online social network service such as LinkedIn). For example, if the member posts information on an online social network (e.g., Facebook, LinkedIn, Twitter, etc.) indicating that they are currently located at a particular venue (e.g., a "check-in" or status update on Facebook or LinkedIn at a restaurant, event, convention hall, store, city, etc.), the time zone inference module 210 may determine that the member is currently located at that venue, and may identify the geographic location of that venue. The time zone inference module 210 may then identify the time zone in which that venue is located (based on publically available data indicating correspondences between geographic locations and time zones), in order to ultimately determine that the member is currently located in that time zone.

In some embodiments, the time zone inference module 210 may access geolocation information from a mobile device of the member, based on any known geolocation techniques. Thereafter, by determining that the member is currently located in a particular geographic location (e.g., a particular city), the time zone inference module 210 may identify a time zone associated with that geographic location (based on publically available data indicating correspondences between geographic locations and time zones), and determine that the member is currently located in that particular time zone.

In some embodiments, the time zone inference module 210 may access FP address information associated with login requests received from the member (e.g., when a member logs into a website, such as website associated with an online social network service). By accessing a recent IP address (e.g., from the last 24 hours) utilized by the member to login to the site, the time zone inference module 210 may then use known IP address lookup techniques to identify a geographic location associated with this FP address e.g., a city or state). The time zone inference module 210 may identify a time zone associated with that geographic location (based on publically available data indicating correspondences between geographic locations and time zones), and determine that the member is currently located in that particular time zone.

It is understood that the time zone inference module 210 described herein may utilize any combination of the aforementioned sources of information (e.g., member profile data, member behavioral activity, member interactions with the site, geolocation information, IP address login information, and so on) in order to determine the particular time zone of the member.

For example, in some embodiments, the time zone inference module 210 may take into account any combination of the aforementioned sources of information in order to determine a probability or "confidence score" indicating likelihood that the member is currently located in a particular time zone. For example, in some embodiments, weights may be assigned to each of the various sources of information (including user-specified country attribute in the member profile data, a current university attribute in the member profile data, a current employer attribute in the member profile data, current location or "check-in" information displayed in a post or status update by the member on an online social network service, geolocation information, IP address login information, and so on). Thus, in some example embodiments, the time zone inference module 210 may determine the current time zone of the member based on different sources of information, and if there is a discrepancy in these determinations, the time zone inference module 210 may place a greater emphasis on the determination from a first source of information if that first source of information is associated with a higher weight. As an example, the time zone inference module 210 may place a lower weight on member profile data of the member, but a higher weight in the geolocation information from the member's mobile device. Accordingly, if the member profile data of the member indicates that the member is currently located in the US, but the geolocation information from the mobile device of the member indicates a location in Bangalore, India, the time zone inference module 210 may determine that the member is currently located in the time zone associated with Bangalore, India, due to the higher weight assigned to the geolocation information. Put another way, in this example, the geolocation information effectively overrides the information from the member profile data of the member. Thus, the time zone inference module 210 may generate a higher confidence score associated with the possibility that the member is located in the time zone associated with Bangalore, India.

In some embodiments, the time zone inference module 210 may display a user interface allowing a user of the time zone inference module 210 (e.g., an administrator or website personnel) to adjust any of the aforementioned weights, in accordance with campaign goals and various product objectives. For example, the success of some e-mail products may depend on understanding the current time zone of the member, in order to effectively target emails and other content to the member. If it is important for a particular product to have access to the real-time time zone of the member e.g., perhaps for an e-mail being sent immediately), then the geolocation information, IP address information, or the social activity information may be given greater importance and be assigned a higher weight, whereas the member profile data may be assigned smaller weight. On the other hand, if it is important for a particular product to have access to a stable long-term time zone of the member (e.g., perhaps for weekly or monthly digest e-mails being transmitted to the member), then perhaps the member profile data may be assigned a higher weight in comparison to other sources of information.

As described above, the time zone inference module 210 may take into account any combination of the aforementioned sources of information in order to determine a probability or "confidence score" indicating the likelihood that the member is currently located in a particular time zone. In some embodiments, the time zone inference module 210 may perform prediction modeling, using one or more prediction models (e.g., statistical machine learning models), in order to generate the aforementioned confidence score. Examples of prediction models include a logistic regression model, a Naïve Bayes model, a support vector machines (SVM) model, a decision trees model, and a neural network model. For example, in some embodiments, a prediction model may be trained based on feature data (e.g., member profile data, social activity information, geolocation information, IP address login information, etc.) associated with a large plurality of members located in known time zones. Once trained, the prediction module may receive available features associated with a single particular member (e.g., member profile data, social activity information, geolocation information, IP address login information, etc.) in order to determine the likelihood that this member is currently located in a particular time zone.

In some embodiments, the time zone inference module 210 may take into account historical data associated with any of the aforementioned sources of information in order to detect a change in time zone associated with the member, and in order to determine whether such a change in time zone represents a permanent or temporary change in time zone. For example, by examining the IP address information associated with the member, the time zone inference module 210 may detect a change in the IP address used by the member to login to the site. Based on this information, the time zone inference module 210 may determine not only the current time zone of the member as describe above, but also that the current time zone of the member represents a change in time zone. Moreover, by analyzing a log of the previous IP addresses used by the member to login to the site, the time zone inference module 210 may determine that, since only the last IP address has changed, there is a high confidence score or likelihood that this is only a temporary change in time zone. This confidence score or likelihood may be reinforced by any of the other aforementioned sources of information (e.g., member profile data, social activity information, etc., which may not indicate any historical change). On the other hand, if the time zone inference module 210 determines that the last 20 IP addresses used to login to the site have changed to correspond to a new geographic location, and that the member profile data of the member indicates a new employer located at that geographic location, then the time zone inference module 210 may determine that there is a high confidence score or likelihood that this is a permanent change in time zone. In some embodiments, feature data including such historical information may be fed into a prediction model in order to compute confidence scores, as described in more detail above.

The confidence score indicating the likelihood that a change in time zone represents a permanent or temporary change may be valuable in different ways, depending on the relevant product or services utilizing this information in accordance with various campaign goals and product objectives. For example, if it is important for a particular product to have access to the real-time time zone of the member (e.g., perhaps for an e-mail being sent immediately), even if this represents a temporary change in time zone, then the time zone inference module 210 may simply utilize the current time zone of the member. On the other hand, suppose it is important for a particular product to have access to the long-term time zone of the member perhaps for weekly or monthly digest e-mails being transmitted to the member). In such case, the determination that the current time zone represents a temporary change in time zone may result in the previously established time zone of the member being utilized. On the other hand, the determination that the current time zone represents a permanent change in time zone may result in the current time zone being utilized.

Experiment Module 212

According to various example embodiments, the experiment module 212 is configured to identify the optimum time for delivering messages (e.g., e-mails) to users in different geographic locations (e.g., different time zones). The experiment module 212 may identify optimum local message delivery times by performing various message response experiments with respect to users in each location. For example, the experiment module 212 may send messages to users in each location at different (e.g., random) times of the day, and by analyzing how the users interact with the transmitted e-mails, the experiment module 212 may determine which times of the day produce the best responses to the messages e.g., as measured by click through rates) in that time zone. For instance, in some embodiments, the experiment module 212 may identify a test segment/base of, for example, 5000 members of an online social network service that are currently located in a particular time zone. Thereafter, during an experiment cycle (e.g., one week), the experiment module 212 may transmit 5000 instances of an e-mail, one to each of the 5000 members, at random times of the day. In other words, each of the 5000 members may receive the e-mail once during the week-long experiment cycle at a random time of the day. By analyzing response metric associated with each of the e-mails, the experiment module 212 may determine that, for example, e-mails transmitted at a particular time of day (e.g., 2:35 PM) or at a particular time interval (e.g., between 1.30 PM and 4 PM) tend to receive much higher response metrics (e.g., click through rates) in comparison to the messages transmitted at other times of the day or at other time intervals. The experiment module 212 may then classify such a time (or time interval) as an optimum local delivery time. In some embodiments, the experiment module 212 may classify the optimum local delivery time as a time interval (e.g., a one-hour "bucket") that includes the original e-mail transmission time that was associated with the highest response metric. For example, if messages transmitted at 2:35 PM tend to have the best response metrics, the experiment module 212 may determine that the optimum local delivery time is 2 PM to 3 PM.

In some embodiments, the geographic locations described herein may correspond to any known type of location, such as a time zone, building, street, neighbourhood, suburb, city, county, state, region, country, latitude, longitude, etc. The experiment module 212 may determine that a member is currently located in a particular time zone based on, for example, output from the time zone inference module 210 (e.g., after querying the time zone inference module 210). In some embodiments, the messages described herein may be any type of electronic message, including an e-mail, text message (e.g., a short messaging service (SMS) message, a multimedia messaging service (MMS) message, etc.), an instant message associated with an online social network (e.g., Facebook, LinkedIn, Wechat, WhatsApp, etc.), a chat message associated with an online chat service, and so on.

In some embodiments, the response metrics described herein may correspond to any type of metric for measurement of how a user interacts with or responds to a content item such as a message. For example, the response metric may correspond to an access rate indicating rates at which users open, view, or access a message (e.g., by clicking on the message in an inbox in order to open and view the message). Such an access rate may measure the number of access events in comparison to a number of impressions (e.g., the number of times the message was transmitted). The response metric may also correspond to a raw number of access events, a number of access events during a predetermined time interval, and so on. In some embodiments, the response metric may correspond to a click through rate indicating rates at which users click on some content within the message (e.g., a reference link that takes the user to a site). Such a click through rate may measure the number of clicks in comparison to a number of impressions (e.g., the number of times the message was rendered to users). The response metric may also correspond to a raw number of clicks, a number of clicks during a predetermined time interval, and so on. In some embodiments, the response metric may correspond to a reply rate indicating rates at which users reply to the message. Such a reply rate may measure the number of replies in comparison to a number of impressions (e.g., the number of times the message was rendered and viewed by users, or the number of times the message was transmitted to users). The response metric may also correspond to a raw number of replies, a number of replies to during a predetermined time interval, and so on. Similarly, other types of response metrics capturing other possible types of responses may be utilized (e.g., specific user interface movements such as swipes, expanding content, zooming in and out of content, conversions, deletions of content, unsubscribes, marking content as spam, hover responses, etc.).

In some embodiments, the experiment module 212 may simply transmit e-mails at random times of the day during an experiment cycle, as described above. In other embodiments, the experiment module 212 may transmit the e-mails at predetermined or fixed times of the day as opposed to random times of the day. For example, the experiment module 212 may display a user interface enabling a user of the email response prediction system 200 to specify exact times when e-mails should be transmitted, or to specify that e-mails should be transmitted at fixed intervals e.g., every second, every minute, every 30 minutes, every hour, etc.).

In some embodiments, the techniques described herein may be utilized to determine not only an optimum time of the day to transmit e-mails, but also an optimum day of the week to transmit e-mails. For example, the experiment module 212 may transmit e-mails to each of the 5000 members in the test base at the same time of the day (e.g., 10 AM) on a random weekday doing the given experiment cycle, and may analyze the results to determine if e-mails transmitted on a certain day of the week tend to produce greater response metrics.

Example Mobile Device

Figure 20:
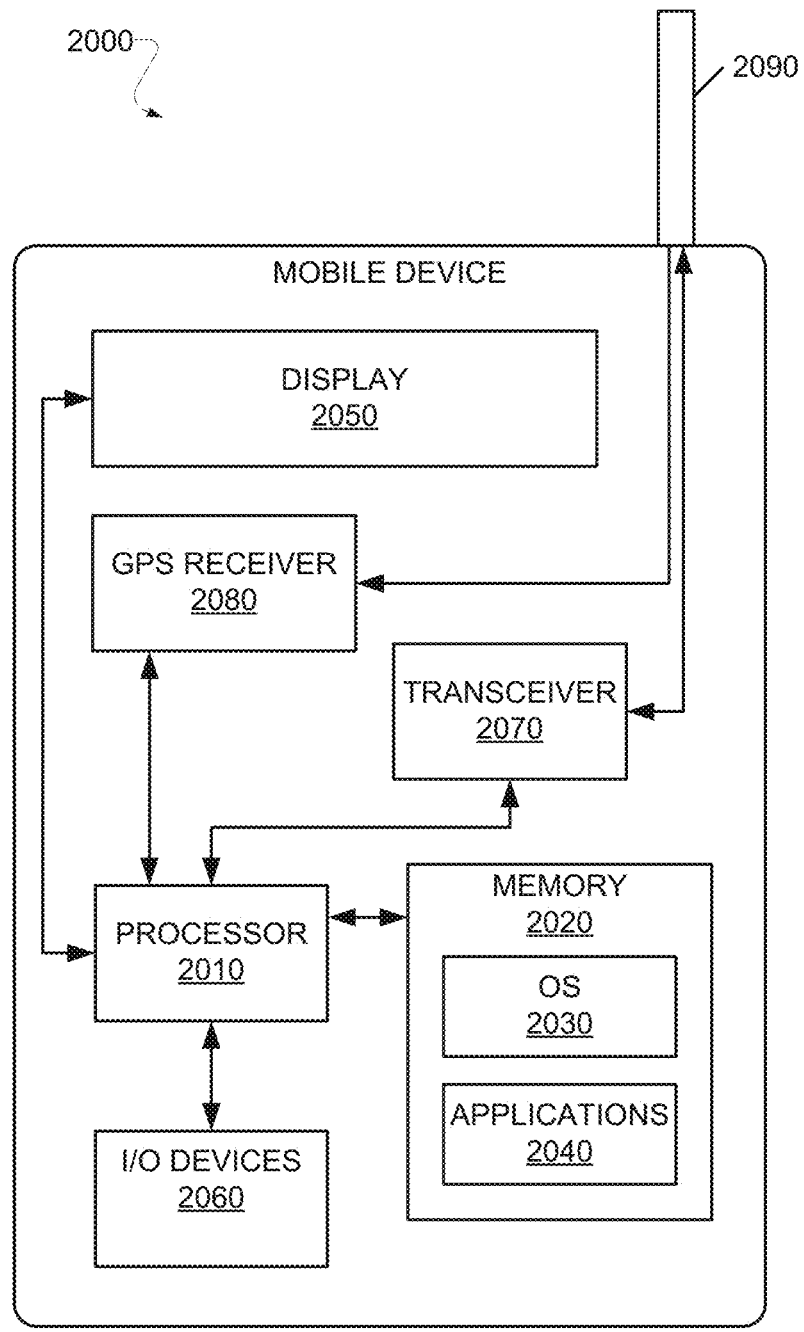
FIG. 20 illustrates an example mobile device, according to various embodiments.

FIG. 20 is a block diagram illustrating the mobile device 2000, according to an example embodiment. The mobile device may correspond to, for example, one or more client machines or application servers. One or more of the modules of the system 200 illustrated in FIG. 2 may be implemented on or executed by the mobile device 2000. The mobile device 2000 may include a processor 2010. The processor 2010 may be any of a variety of different types of commercially available processors suitable for mobile devices (for example, an XScale architecture microprocessor, a Microprocessor without Interlocked Pipeline Stages (MIPS) architecture processor, or another type of processor). A memory 2020, such as a Random Access Memory (RAM), a Flash memory, or other type of memory, is typically accessible to the processor 2010. The memory 2020 may be adapted to store an operating system (OS) 2030, as well as application programs 2040, such as a mobile location enabled application that may provide location based services to a user. The processor 2010 may be coupled, either directly or via appropriate intermediary hardware, to a display 2050 and to one or more input/output (I/O) devices 2060, such as a keypad, a touch panel sensor, a microphone, and the like. Similarly, in some embodiments, the processor 2010 may be coupled to a transceiver 2070 that interfaces with an antenna 2090. The transceiver 2070 may be configured to both transmit and receive cellular network signals, wireless data signals, or other types of signals via the antenna 2090, depending on the nature of the mobile device 2000. Further, in some configurations, a GPS receiver 2080 may also make use of the antenna 2090 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules in embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
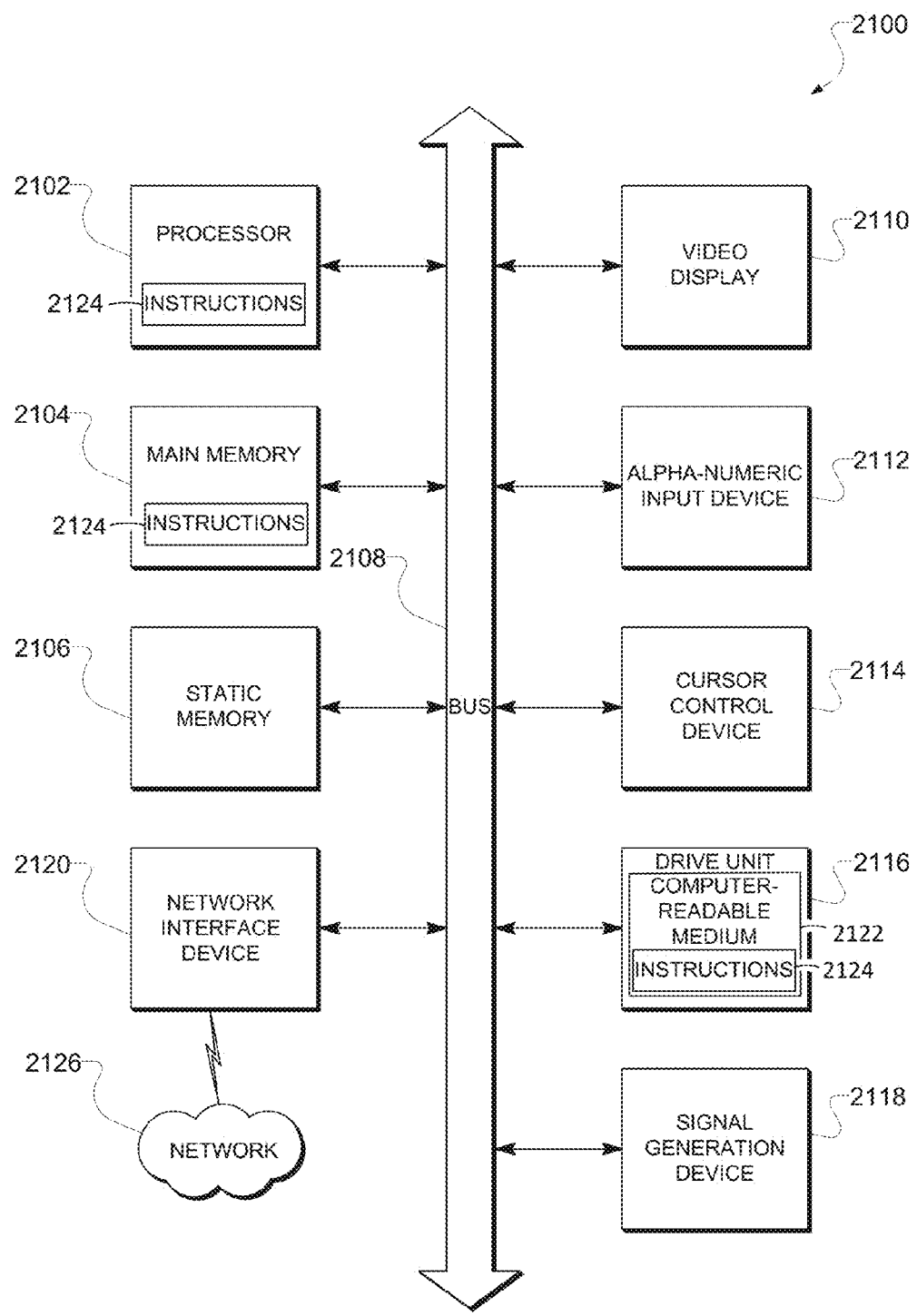
FIG. 21 is a diagrammatic representation of a machine in the example form of a computer system within which a set of instructions, for causing the machine to perform any one or more of the methodologies discussed herein, may be executed.

FIG. 21 is a block diagram of machine in the example form of a computer system 2100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard or a touch-sensitive display screen), a user interface (UI) navigation device 2114 (e.g., a mouse), a disk drive unit 2116, a signal generation device 2118 (e.g., a speaker) and a network interface device 2120.

Machine-Readable Medium

The disk drive unit 2116 includes a machine-readable medium 2122 on which is stored one or more sets of instructions and data structures (e.g., software) 2124 embodying or utilized by any one or more of the methodologies or functions described herein. The instructions 2124 may also reside, completely or at least partially, within the main memory 2104 and/or within the processor 2102 during execution thereof by the computer system 2100, the main memory 2104 and the processor 2102 also constituting machine-readable media.

While the machine-readable medium 2122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2124 may further be transmitted or received over a communications network 2126 using a transmission medium. The instructions 2124 may be transmitted using the network interface device 2120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   determining by a machine including a memory and at least one processor, for each of a plurality of time intervals, a likelihood of a particular member of an online social network service performing a particular member user action on a particular message content item during the corresponding time interval;
   ranking the plurality of time intervals, based on the determined likelihoods corresponding to the plurality of time intervals;
   identifying a particular time interval from among the plurality of time intervals that is associated with a highest ranking; and
   classifying the particular time interval as an optimum personalized message delivery time for the particular member;
   wherein the determining comprises:
      accessing, via one or more data sources, data including:
         email content data describing a particular email content item and member email Interaction data describing the particular member's interactions with various email content; and
         geolocation data indicating a current location of a client device of the particular member at a time interval corresponding to the particular member's interaction with the various email content;
      encoding the data accessed from the one or more data sources into one or more feature vectors, and assembling the one or more feature vectors to thereby generate an assembled feature vector; and
      performing prediction modeling, based on the assembled feature vector and a trained prediction model, to predict the likelihood of the particular member performing the particular user action on the particular email content item.

2. The method of claim 1, further comprising:
   determining a time zone associated with the current location of the client device of the particular member; and
   encoding the time zone into the assembled feature vector.

3. The method of claim 1, wherein the email content data specifies an email type, and wherein the email type is at least one of a network connection update e-mail, a news update e-mail, a jobs update e-mail, an influencer post update e-mail, a company update e-mail, a group update e-mail, a university update e-mail, and a digest e-mail.

4. The method of claim 1, wherein the member email interaction data indicates a quantity of various email types transmitted to the particular member, a quantity of clicks submitted by the particular member in conjunction with the various email types, and a quantity of email unsubscribe requests submitted by the particular member in conjunction with the various email types.

5. The method of claim 1, further comprising:
accessing, via one or more data sources, member site interaction data describing the particular member's interaction with various features or content of an online social network service; and
encoding the member site interaction data into the assembled feature vector.

6. The method of claim 1, further comprising:
accessing, via one or more data sources, member profile data describing the particular member; and
encoding the member profile data into the assembled feature vector.

7. The method of claim 1, wherein the prediction model is any one of a logistic regression model, a Naïve Bayes model, a support vector machines (SVM) model, a decision trees model, and a neural network model.

8. The method of claim 1, wherein the prediction modeling comprises a training operation to refine coefficients of a logistic regression model, based on training set data comprising the assembled feature vector.

9. A system comprising:
a processors; and
a memory comprising instructions that, when executed the processor, cause the system to:
determine, for each of a plurality of time intervals, a likelihood of a particular member of an online social network service performing a particular member user action on a particular message content item during the corresponding time interval;
rank the plurality of time intervals, based on the determined likelihoods corresponding to the plurality of time intervals;
identify a particular time interval from among the plurality of time intervals that is associated with highest ranking; and
classify the particular time interval as an optimum personalized message delivery time for the particular member;
wherein to determine the likelihood, the memory comprises instructions that, when executed by the processor, cause the system to:
access, via one or more data sources, data including:
email content data describing a particular email content item and member email interaction data describing the particular members interactions with various email content; and
geolocation data indicating a current location of a client device of the particular member at a time interval corresponding to the particular member's interactions with the various email content;
encode the data accessed from the one or more data sources into one or more feature vectors, and assembling the one or more feature vectors to thereby generate an assembled feature vector; and
perform prediction modeling, based on the assembled feature vector and a trained prediction model, to predict the likelihood of the particular member performing the particular user action on the particular email content item.

10. The system of claim 9, further comprising instructions that, when executed by the processor, cause the system to:
determine a time zone associated with the current location of the client device of the particular member; and
encode the time zone into the assembled feature vector.

11. The system of claim 9, wherein the email content data specifies an email type, and wherein the email is at least one of a network connection update e-mail, a news update e-mail, a jobs update e-mail, an influencer post update e-mail, a company update e-mail, a group update e-mail, a university update e-mail, and a digest e-mail.

12. The system of claim 9, wherein the member email interaction data indicates a quantity of various email types transmitted to the particular member, a quantity of clicks submitted by the particular member in conjunction with the various email types, and a quantity of email unsubscribe requests submitted by the particular member in conjunction with the various email types.

13. The system of claim 9, further comprising instructions that, when executed by the processor, cause the system to:
access, via one or more data sources, member site interaction data describing the particular member's interaction with various features or content of an online social network service; and
encode the member site interaction data into the assembled feature vector.

14. The system of claim 9, further comprising instructions that, when executed by the processor, cause the system to:
access, via one or more data sources, member profile data describing the particular member; and
encode the member profile data into the assembled feature vector.

15. The system of claim 9, wherein the prediction model is any one of a logistic regression model, a Naïve Bayes model, a support vector machines (SVM) model, a decision trees model, and a neural network model.

16. The system of claim 9, wherein the prediction modeling comprises a training operation to refine coefficients of a logistics regression model, based on training set data comprising the assembled feature vector.

17. A non-transitory machine-readable storage medium comprising instructions that, when executed by one or more processors of a machine, cause the machine to perform operations comprising:
determining, for each of a plurality of time intervals, a likelihood of a particular member of an online social network service performing a particular member user action on a particular message content item during the corresponding time interval;
ranking the plurality of time interval, based on the determined likelihoods corresponding to the plurality of time intervals;
identifying a particular time interval from among the plurality of time intervals that is associated with a highest ranking; and
classifying the particular time interval as an optimum personalized message delivery time for the particular member;
wherein the determining comprises:
accessing, via one or more data sources, data including:
email content data describing a particular email content item and member email interaction data describing the particular member's interactions with various email content; and geolocation data indicating a current location of a client device of the particular member at a time interval corresponding to the particular member's interactions with the various email content;

encoding the data accessed from the one or more data sources into one or more feature vectors, and assembling the one or more feature vectors to thereby generate an assembled feature vector; and performing prediction modeling, based on the assembled feature vector and a trained prediction model, to predict the likelihood of the particular member performing the particular user action on the particular email content item.

18. The storage medium of claim 17, the operations further comprising:

determining a time zone associated with the current location of the client device of the particular member; and encoding the time zone into the assembled feature vector.

19. The storage medium of claim 17, the operations further comprising:

accessing, via one or more data sources, member site interaction data describing the particular member's interaction with various features or content of an online social network service; and encoding the member site interaction data into the assembled feature vector.

20. The storage medium of claim 17, the operations further comprising:

accessing, via one or more data sources, member profile data describing the particular member; and encoding the member profile data into the assembled feature vector.

* * * * *

UNITED STATES PATENT AND TRADEMARK OFFICE
CERTIFICATE OF CORRECTION

PATENT NO. : 9,967,226 B2  
APPLICATION NO. : 15/289836  
DATED : May 8, 2018  
INVENTOR(S) : Vijay et al.

Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 32, Line 25, in Claim 1, after "determining", insert --,--

In Column 32, Line 43, in Claim 1, delete "Interaction" and insert --interaction-- therefor In Column 32, Line 49, in Claim 1, delete "interaction" and insert --interactions-- therefor In Column 33, Line 31, in Claim 9, delete "processors;" and insert --processor;-- therefor In Column 33, Line 32, in Claim 9, after "executed", insert --by--

In Column 33, Line 43, in Claim 9, after "with", insert --a--

In Column 33, Line 54, in Claim 9, delete "members" and insert --member's-- therefor In Column 34, Line 9, in Claim 11, after "email", insert --type--

In Column 34, Line 42, in Claim 16, delete "logistics" and insert --logistic-- therefor In Column 34, Line 53, in Claim 17, delete "interval," and insert --intervals,-- therefor Signed and Sealed this  
Fourth Day of June, 2019

Andrei Iancu  
*Director of the United States Patent and Trademark Office*